(12) United States Patent  
Nozaki

(10) Patent No.: US 8,875,045 B2
(45) Date of Patent: Oct. 28, 2014

(54) DISPLAY CONTROL DEVICE, DISPLAY CONTROL METHOD, AND PROGRAM

(75) Inventor: Shinichi Nozaki, Kanagawa (JP)

(73) Assignee: Sony Corporation (JP)

( * ) Notice: Subject to any disclaimer, the term of this patent is extended or adjusted under 35 U.S.C. 154(b) by 854 days.

(21) Appl. No.: 12/655,352

(22) Filed: Dec. 29, 2009

(65) Prior Publication Data

US 2010/0175028 A1 Jul. 8, 2010

(30) Foreign Application Priority Data

Jan. 5, 2009 (JP) ................................ P2009-000417

(51) Int. Cl.
*G06F 3/048* (2013.01)
*H04N 5/232* (2006.01)
*G06F 3/0485* (2013.01)

(52) U.S. Cl.
CPC ........... *H04N 5/232* (2013.01); *H04N 5/23216* (2013.01); *G06F 3/04855* (2013.01)
USPC ............ 715/786; 715/781; 715/783; 715/787

(58) Field of Classification Search
CPC .................................................. G06F 3/04855
USPC .......................................... 715/781, 783–787
See application file for complete search history.

(56) References Cited

U.S. PATENT DOCUMENTS

| | | | |
|---|---|---|---|
| 5,289,205 A * | 2/1994 | Torres ............................ | 345/685 |
| 5,796,399 A * | 8/1998 | Alderson ...................... | 715/844 |
| 5,859,638 A * | 1/1999 | Coleman et al. .............. | 715/786 |
| 5,970,466 A * | 10/1999 | Detjen et al. ................. | 705/7.19 |
| 6,020,887 A * | 2/2000 | Loring et al. ................. | 715/786 |
| 2003/0036927 A1 * | 2/2003 | Bowen .............................. | 705/4 |
| 2007/0018760 A1 * | 1/2007 | Jeong et al. ..................... | 335/78 |
| 2007/0136683 A1 | 6/2007 | Heidari et al. | |
| 2007/0285387 A1 * | 12/2007 | Cheng et al. ................... | 345/156 |
| 2008/0052636 A1 * | 2/2008 | Abe et al. ...................... | 715/786 |
| 2008/0238755 A1 * | 10/2008 | Cruz et al. ..................... | 341/176 |
| 2008/0300939 A1 * | 12/2008 | Oikonomidis .................... | 705/7 |
| 2009/0070707 A1 * | 3/2009 | Schaller et al. ................ | 715/787 |
| 2009/0177994 A1 * | 7/2009 | Hollemans et al. ........... | 715/784 |

FOREIGN PATENT DOCUMENTS

| | | |
|---|---|---|
| JP | 11345061 A | 12/1999 |
| JP | 2000039947 A | 2/2000 |

(Continued)

OTHER PUBLICATIONS

Office Action from Japanese Application No. 2009-000417, dated Nov. 24, 2010.

*Primary Examiner* — Tadeese Hailu
(74) *Attorney, Agent, or Firm* — Lerner, David, Littenberg, Krumholz & Mentlik, LLP

(57) ABSTRACT

A display control device includes a display control unit and an input unit. The display control unit is configured to display, on a display screen, a first selection area displaying a list of a plurality of first data items, a first scroll bar corresponding to the first selection area, a second selection area displaying a list of a plurality of second data items, and a second scroll bar corresponding to the second selection area. The input unit is configured to receive a selection operation for selecting at least one item from the first data items displayed in the list in the first selection area. In conjunction with the selection operation of the first data item, the display control unit changes the second data items displayed in the list in the second selection area and the display mode of the second scroll bar.

25 Claims, 10 Drawing Sheets

(56) References Cited

FOREIGN PATENT DOCUMENTS

| JP | 2000099534 A | 4/2000 |
| JP | 2000322427 A | 11/2000 |
| JP | 2002215650 A | 8/2002 |
| JP | 2004185340 A | 7/2004 |
| JP | 2005269011 A | 9/2005 |
| JP | 2006-295236 A | 10/2006 |
| JP | 2007052526 A | 3/2007 |

* cited by examiner

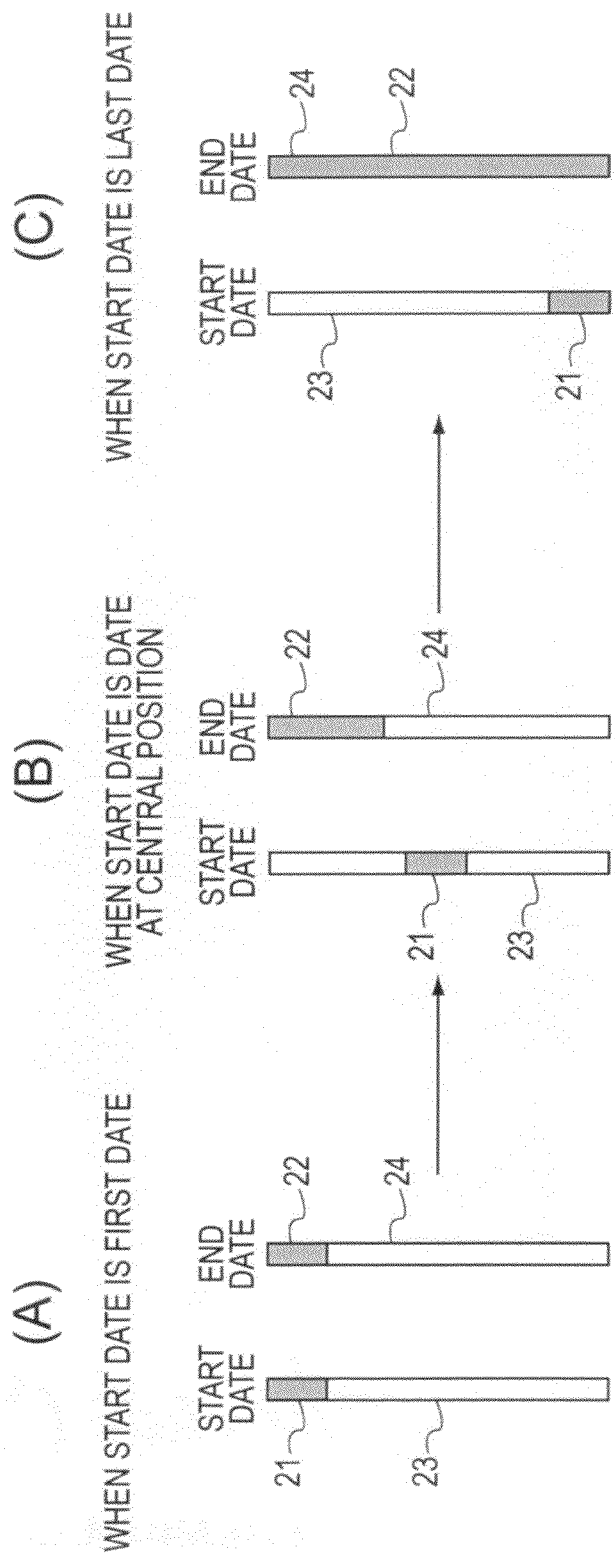

DISPLAY CONTROL DEVICE, DISPLAY CONTROL METHOD, AND PROGRAM

CROSS-REFERENCE TO RELATED APPLICATION

The present application claims priority from Japanese Patent Application No. JP 2009-000417 filed in the Japanese Patent Office on Jan. 5, 2009, the entire content of which is incorporated herein by reference.

BACKGROUND OF THE INVENTION

1. Field of the Invention

The present invention relates to a display control device, a display control method, and a program.

2. Description of the Related Art

In recent years, along with the development of data processing technology, there have been increasing opportunities for users to access a large amount of data. For example, there have been increasing opportunities for users to watch a large amount of content data, such as content data shot by a digital still camera or a digital video camera and content data of a television broadcast program recorded by a video recorder. For example, if there is a large amount of content data shot by a video camera, a user may sometimes want to select and reproduce only desired content data from the large amount of content data.

As a user interface for data selection, a system has been commonly used in the past which displays a list of data identification information items (e.g., file names and thumbnail images) in a selection area, such as a list box and a window, to allow a user to specify a desired data item from the list (see Japanese Unexamined Patent Application No. 2006-295236, for example).

SUMMARY OF THE INVENTION

However, the existing user interface for data selection is a system which displays a list of data items in a single selection area such that desired data items are individually selected from the list. Therefore, this user interface is unsuitable for a selection operation in which the range (the start point and the end point) of data items is specified and a selection operation of plural types of data items.

For example, in the above-described example of the video camera, the user sometimes specifies the date period (the start date and the end date) of shooting to select a content data item desired to be reproduced from multiple content data items. In such a case, if the user interface displays only the above-described single selection area on a display screen, it is inconvenient for the user to select both the start date and the end date. Further, even if a plurality of selection areas are provided to select the start date and the end date respectively, each of the two selection areas displays a large number of items. Therefore, the selection operation performed by the user is complicated. In addition, it is difficult for the user to grasp at a glance the item number of data items (dates) displayed in a list in each of the selection areas and the location of a desired data item. Therefore, the selection operation of the desired data item takes time and trouble.

Therefore, the present invention has been made in view of the above-described circumstances. It is desired in the present invention to provide a user interface capable of making it easy to select a plurality of data items and grasp the display position of a desired data item.

To address the above-described issues, an embodiment of the present invention provides a display control device including a display control unit and an input unit. The display control unit is configured to display, on a display screen, a first selection area displaying a list of a plurality of first data items, a first scroll bar corresponding to the first selection area, a second selection area displaying a list of a plurality of second data items, and a second scroll bar corresponding to the second selection area. The input unit is configured to receive a selection operation for selecting at least one item from the first data items displayed in the list in the first selection area. In conjunction with the selection operation of the first data item, the display control unit changes the second data items displayed in the list in the second selection area and the display mode of the second scroll bar.

The display control unit may extract the first data items and the second data items from at least one data group held in a data table, and may display the list of the first data items and the list of the second data items in the first selection area and the second selection area, respectively.

On the basis of the data table, the display control unit may select the second data items in accordance with the first data item selected by the selection operation, and may display a list of the selected second data items in the second selection area.

In accordance with the number of the selected second data items displayed in the list in the second selection area, the display control unit may change the display mode of the second scroll bar.

The display mode of the second scroll bar may be at least one of the display position and the size of the second scroll bar.

The first data items and the second data items may be the same type of data items, and may be extracted from the same data group held in the data table.

The first data items and the second data items may be different types of data items, and may be extracted from mutually different data groups associated with each other in the data table.

The display control unit may change the display mode of the first scroll bar in accordance with the number of the first data items displayed in the list in the first selection area, and may change the display mode of the second scroll bar in accordance with the number of the second data items displayed in the list in the second selection area.

The data group held in the data table may be metadata relating to content data, and the display control device may further include a reproduction unit configured to reproduce the content data corresponding to the first data item selected in the first selection area and the second data item selected in the second selection area.

Further, to address the above-described issues, another embodiment of the present invention provides a display control method including the steps of: displaying, on a display screen, a first selection area displaying a list of a plurality of first data items, a first scroll bar corresponding to the first selection area, a second selection area displaying a list of a plurality of second data items, and a second scroll bar corresponding to the second selection area; receiving a user input for selecting one item from the plurality of first data items displayed in the list in the first selection area; and changing, in conjunction with the selection operation of the first data item, the second data items displayed in the list in the second selection area and the display mode of the second scroll bar.

Further, to address the above-described issues, another embodiment of the present invention provides a program for causing a computer to execute the steps of: displaying, on a display screen, a first selection area displaying a list of a plurality of first data items, a first scroll bar corresponding to the first selection area, a second selection area displaying a list of a plurality of second data items, and a second scroll bar corresponding to the second selection area; receiving a user input for selecting one item from the plurality of first data items displayed in the list in the first selection area; and changing, in conjunction with the selection operation of the first data item, the second data items displayed in the list in the second selection area and the display mode of the second scroll bar.

With the above-described configuration, a first selection area displaying a list of a plurality of first data items, a first scroll bar corresponding to the first selection area, a second selection area displaying a list of a plurality of second data items, and a second scroll bar corresponding to the second selection area are displayed on a display screen, and a user input for selecting one item from the plurality of first data items displayed in the list in the first selection area is received. Then, in conjunction with the selection operation of the first data item, the second data items displayed in the list in the second selection area and the display mode of the second scroll bar are changed. Thereby, the second data items displayed in the list in the second selection area and the display mode of the second scroll bar are changed in accordance with the first data item selected in the first selection area. After the selection of the first data item in the first selection area, therefore, if a user checks the second data items displayed in the list in the second selection area and the display mode of the second scroll bar, the user can easily grasp the display position of the second data items selectable in the second selection area, and can also easily select a desired second data item.

As described above, according to the embodiments of the present invention, it is possible to provide a user interface capable of making it easy to select a plurality of data items and grasp the display position of a desired data item.

BRIEF DESCRIPTION OF THE DRAWINGS

FIG. 6 is an explanatory diagram for explaining display operations of scroll bars according to the same embodiment;

DESCRIPTION OF THE PREFERRED EMBODIMENTS

Figure 1:
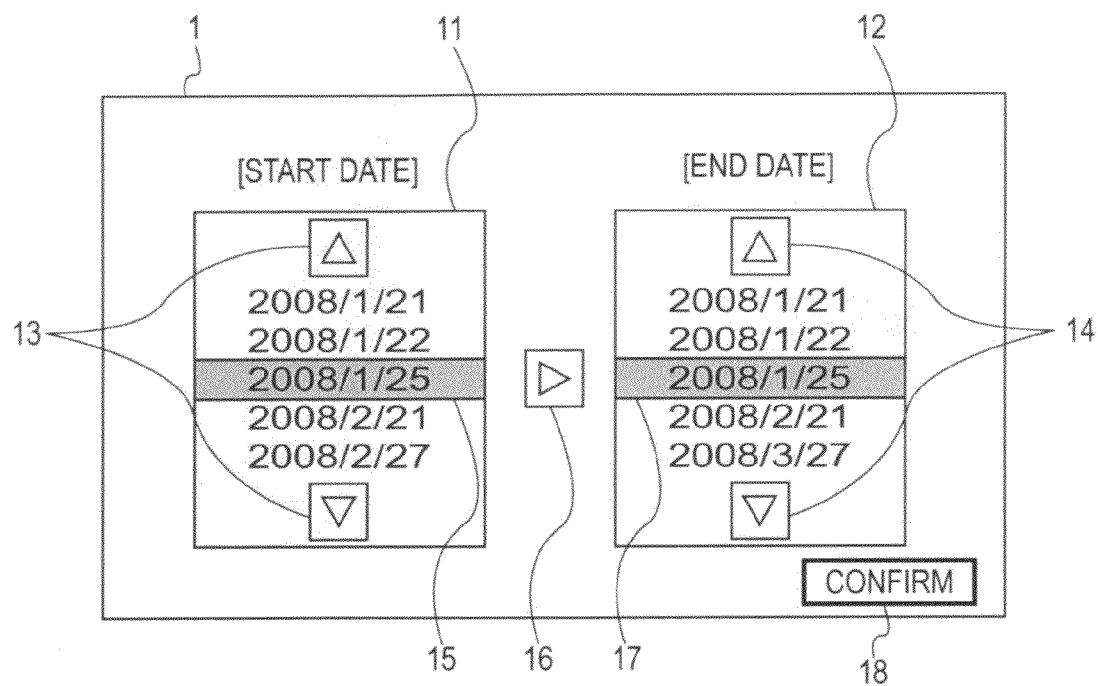
FIG. 1 is a schematic diagram illustrating a display example of a data selection screen according to a related technique of the present invention.

With reference to the accompanying drawings, preferred embodiments of the present invention will be described in detail below. In the present specification and drawings, constituent components having substantially the same functional configuration will be assigned with the same reference numeral, and redundant description thereof will be omitted.

The description will be made in the following order: 1. First Embodiment (GUI for Selecting Same Type of Data Items (Start Date and End Date) in A Plurality of Selection Areas), which includes 1.1. GUI according to Related Technique of First Embodiment, 1.2. Summary of GUI according to First Embodiment, 1.3. Configuration of Display Control Device, 1.4. Configuration of Data Table, 1.5. Data Selection Method, and 1.6. Display Control Operation Flow; and Second Embodiment (User Interface Screen for Selecting Different Types of Data Items (e.g., Date, Genre, and Location) in A Plurality of Selection Areas), which includes 2.1. Summary of GUI according to Second Embodiment, 2.2. Example of Data Selection Screen, and 2.3. Modified Example of Data Selection Screen.

1. First Embodiment

A display control device, a display control method, and a program according to a first embodiment of the present invention will be described in detail below. In the following embodiment, description will be made of an example in which the display control device according to the embodiment of the present invention is applied to an imaging device, e.g., a video camera, and in which metadata of content data imaged by the video camera is used as data items in a selection area to select content data to be reproduced. However, the present invention is not limited to the above-described example.

1.1. GUI according to Related Technique of First Embodiment: Prior to the description of the present embodiment, a GUI (Graphical User Interface) for data selection according to a related technique of the present embodiment will be first described with reference to FIG. 1. FIG. 1 is a schematic diagram illustrating a display example of a data selection screen 1 according to a related technique of the present embodiment.

As illustrated in FIG. 1, a display of a video camera, for example, displays the data selection screen (hereinafter referred to as the reproduction date selection screen) 1, which is a GUI for data selection. The reproduction date selection screen 1 is an example of a data selection screen for selecting at least one data item from a plurality of data items displayed in a list. The reproduction date selection screen 1 is a screen used by a user to specify a date period and select content items desired to be reproduced from multiple content data items (hereinafter simply referred to as "content items") imaged by the video camera and recorded in a recording medium. Herein, the reproduction of content according to the present embodiment may be performed by an arbitrary reproduction method, such as normal reproduction, highlight reproduction, slideshow reproduction, and random reproduction, for example, as long as the method continuously reproduces a plurality of content items. The highlight reproduction refers to a reproduction method of continuously reproducing content items by extracting only characteristic portions from the plurality of content items.

The reproduction date selection screen 1 of FIG. 1 includes a start date selection area 11 and an end date selection area 12. Each of the start date selection area 11 and the end date selection area 12 is an example of a selection area for selecting one data item from a plurality of data items (options) displayed in a list, and is formed by a list box, for example. Each of the start date selection area and the end date selection area 12 displays a list of a plurality of dates as the data items selected by the user. The dates represent the shooting dates of the content items shot by the video camera. That is, each of the start date selection area 11 and the end date selection area 12 displays, as a date list, a list of the respective shooting dates of a plurality of content items held by the video camera. The start date selection area 11 is an area for selecting the date of the content item with which the reproduction is to be started (the start date) from a plurality of content items desired by the user to be reproduced. Meanwhile, the end date selection area 12 is an area for selecting the date of the content item with which the reproduction is to be ended (the end date) from a plurality of content items desired by the user to be reproduced.

With the use of the start date selection area 11 and the end date selection area 12 described above, the user can specify the range of content items desired to be reproduced, i.e., the reproduction date period (the start date and the end date). Accordingly, the user can select a plurality of content items desired to be reproduced from the multiple content items held in the video camera. In accordance with the reproduction date period selection operation performed on the above-described reproduction date selection screen 1 by the user, the video camera reproduces and displays, on a display thereof, the content items corresponding to the selected reproduction date period. That is, the video camera starts the reproduction from the content item corresponding to the date selected in the start date selection area 11, and continues to reproduce the content items in the order of the shooting date up to the content item corresponding to the date selected in the end date selection area 12.

A date selection procedure performed on the reproduction date selection screen 1 will now be described in detail. Firstly, to select the start date in the start date selection area 11, the user presses up and down buttons 13. Thereby, the date list is moved up and down, and the user can select the start date. The display position of a central cursor 15 is fixed. If the start date desired to be selected is adjusted to the position of the central cursor 15, the start date can be selected. The example illustrated in the drawing illustrates a state in which a date "2008/Jan./25" adjusted to the position of the central cursor 15 is selected.

Then, to select the end date, the user first presses a selection area switch button 16 to activate the end date selection area 12. Thereafter, the user presses up and down buttons 14 in the end date selection area 12 in a similar manner as in the selection of the start date, to thereby adjust a desired date to a central cursor 17 and select the end date. After having selected the start date and the end date in the above-described manner, the user finally presses a confirmation button 18. Thereby, the video camera extracts a plurality of content items imaged during the above-selected reproduction date period from the multiple recorded content items, and sequentially reproduces the extracted content items in the order of the shooting date. Upon selection of the start date, the date list displayed in the end date selection area 12 may be changed to a date list displaying only the start date and the subsequent dates.

In the above-described reproduction date selection screen 1 of FIG. 1, however, the user presses the up and down buttons 13 and 14 many times to select an item from each of the date lists in the start date selection area 11 and the end date selection area 12. Further, the user also presses the up and down buttons 13 and 14 many times to check the list amount (the number of data items) of each of the date lists containing selectable items. As described above, therefore, the above-described reproduction date selection screen 1 is unsuitable for the selection of desired data from a large amount of data.

If, upon selection of the start date, the end date list displayed in the end date selection area 12 is filtered on the basis of the start date as the filtering condition to display a list of only the start date and the subsequent dates, the amount of the end date list can be reduced. Even with such filtering, however, the user still presses the up and down buttons 13 and 14 many times to select a desired date from each of the date lists and to check the list amount of the date list. If desired content is selected and reproduced in units of dates from a large amount of content imaged by the video camera, therefore, considerable time and trouble are taken. Thus, this system is inconvenient. Further, if a date list has a vast amount of content, it is difficult for the user to select an intended date period and reproduce the corresponding content. In addition, the user has difficulty in grasping at a glance the number of items of the date list displayed as a list in the start date selection area 11 and the end date selection area 12 and the position of the date currently selected in the entire date list.

In view of the above, the present embodiment described in detail below addresses the above-described issues of the user interface according to the background technique of the present invention, and also the issues of the user interface according to the related technique of the present embodiment illustrated in FIG. 1.

Figure 2:
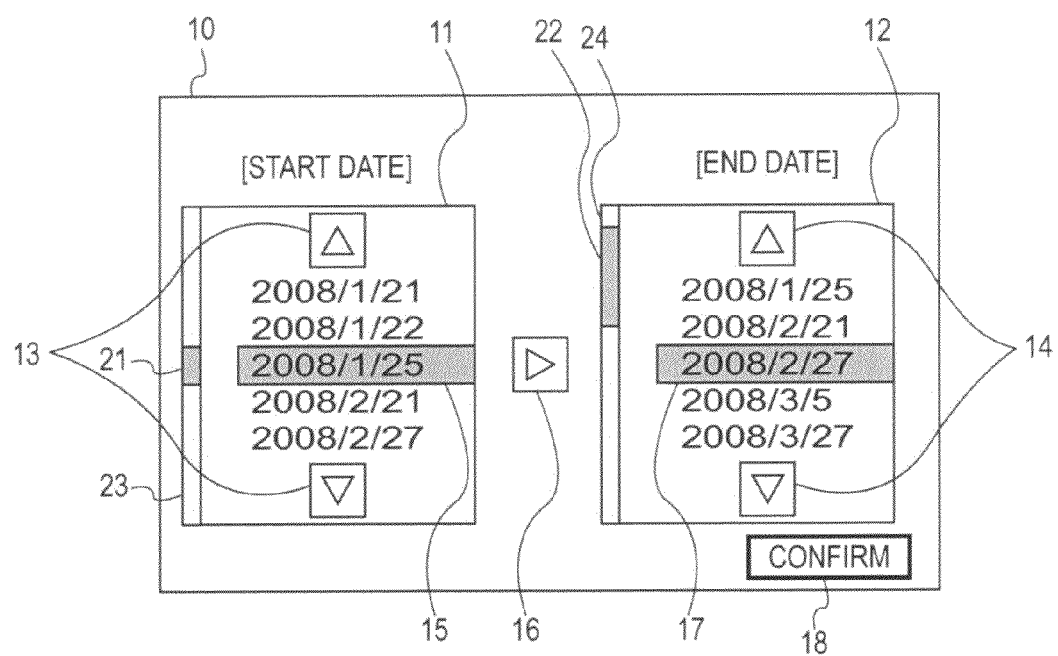
FIG. 2 is a schematic diagram illustrating a display example of a reproduction date selection screen according to a first embodiment of the present invention.

1.2. Summary of GUI according to First Embodiment:
Subsequently, with reference to FIG. 2, a summary of a GUI for data selection according to the first embodiment of the present invention will be described. FIG. 2 is a schematic diagram illustrating a display example of a reproduction date selection screen 10 according to the present embodiment.

As illustrated in FIG. 2, the display of the video camera serving as the display control device according to the present embodiment displays the reproduction date selection screen 10 serving as a user interface for data selection. The reproduction date selection screen 10 is an example of a data selection screen including a plurality of selection areas for selecting at least one data item from a plurality of data items displayed in a list. Similarly to the reproduction date selection screen 1 of FIG. 1, the above-described reproduction date selection screen 10 includes the start date selection area 11 (a first selection area), the end date selection area (a second selection area), the up and down buttons 13 and 14, the central cursors 15 and 17, the selection area switch button 16, and the confirmation button 18. For example, the start date selection area 11 is a list box displaying a list of a plurality of start dates (first data items) selected by the user, and the end date selection area 12 is a list box displaying a list of a plurality of end dates (second data items) selected by the user.

Further, the reproduction date selection screen 10 includes a scroll bar 21 (a first scroll bar) corresponding to the start date selection area 11 (the first selection area) and a scroll bar 22 (a second scroll bar) corresponding to the end date selection area 12 (the second selection area). The above-described scroll bars 21 and 22 are provided to one side of the start date selection area 11 and one side of the end date selection area 12, respectively, to be movable in the up and down directions in scroll areas 23 and 24, respectively.

The scroll bar 21 is a GUI component for selecting one start date from the start dates displayed in a list in the start date selection area 11. The scroll bar 22 is a GUI component for selecting one end date from the end dates displayed in a list in the end date selection area 12. Further, the scroll area 23 is provided along a lateral side of the start date selection area 11, and has the same length as the vertical length of the start date selection area 11. The scroll area 23 defines the range in which the scroll bar can move in the up and down directions. Meanwhile, the scroll area 24 is provided along a lateral side of the end date selection area 12, and has the same length as the vertical length of the end date selection area 12. The scroll area 24 defines the range in which the scroll bar 22 can move in the up and down directions.

The size of the above-described scroll bar 21 is changed in accordance with the number of the start dates displayed in a list in the start date selection area 11. Further, the display position of the scroll bar 21 in the scroll area 23 is changed in accordance with the number of the start dates and the display order of the data item selected in the start date selection area 11 (the start date adjusted to the position of the central cursor 15). Similarly, the size of the scroll bar 22 is changed in accordance with the number of the end dates displayed in a list in the end date selection area 12. The display position of the scroll bar 22 in the scroll area 24 is changed in accordance with the number of the end dates and the display order of the data item selected in the end date selection area 12 (the end date adjusted to the position of the central cursor 17).

As described above, each of the scroll bars 21 and 22 is variably displayed in real time in accordance with the number of data items (dates) displayed in the corresponding one of the start date selection area 11 and the end date selection area 12 and the position of the selected data item. In the present embodiment, the reproduction date selection screen 10 displays the above-described scroll bars 21 and 22. Accordingly, the user can easily grasp the number of data items (dates) displayed in each of the selection areas 11 and 12 and the position of the selected data item.

In the above-described reproduction date selection screen 10, the user presses the up and down buttons 13 to perform an operation of selecting at least one date from the start dates displayed in a list in the start date selection area 11. Then, in conjunction with the above-described start date selection operation and in accordance with the selected start date, a display control unit of the video camera changes the display content of the end dates displayed in a list in the end date selection area 12 and the display mode of the scroll bar 22.

That is, in the selection of the date period defined by the start date and the end date, upon selection of the start date, the end date is narrowed down to the start date and the subsequent dates. In the example of FIG. 2, "2008/Jan./25" is selected as the start date. Therefore, the end date is narrowed down to the date "2008/Jan./25" and the subsequent dates. Thus, in accordance with the start date selected in the start date selection area 11, the display control unit selects (filters) the end dates, and displays a list of the selected end dates in the end date selection area 12. That is, the display control unit extracts, from a date data group of candidates to be displayed as the end dates, the date data of the start date selected in the start date selection area 11 and the subsequent dates, and displays a list of the date data in the end date selection area 12 as the candidates to be selected as the end date. Thereby, the end date selection area 12 displays not all dates of the date data group present in a database but a list of only the above-selected start date and the subsequent dates. Therefore, it is possible to narrow down the end dates displayed as options in the end date selection area 12 to only actually selectable dates, to thereby reduce the number of items of the end date list. Accordingly, the user can easily find and select a desired end date in the end date selection area 12.

In addition, in conjunction with the start date selection operation in the start date selection area 11, the display control unit changes the display mode (e.g., the size and the display position) of the scroll bar 22 in the end date selection area 12. Specifically, the display control unit selects the end dates in the above-described manner in accordance with the start date selected in the start date selection area 11, and changes the size of the scroll bar 22 in accordance with the number of the selected end dates. Further, the display control unit changes the display position of the scroll bar 22 in the scroll area 24 in accordance with the position in the list (the display order) of the end date currently selected by the central cursor 17 in the list of the above-selected ends dates. Accordingly, if the user checks the changed size and display position of the scroll bar 22, the user can easily grasp the number of the end dates displayed in a list in the end date selection area 12 and the position in the list of the currently selected end date. Therefore, the user can more easily find and select the desired end date in the end date selection area 12.

In the above, the summary of the GUI using the reproduction date selection screen 10 according to the present embodiment has been described. According to the present embodiment, the start date selection area 11 (the first selection area) and the end date selection area 12 (the second selection area) display the same type of mutually related data items (i.e., dates). In this case, the present embodiment has a feature of changing the display content of the end dates in the end date selection area 12 and the display mode of the scroll bar 22 in conjunction with the start date selection operation in the start date selection area 11.

A display control device and a display control method according to the present embodiment for providing the above-described user interface will be described in detail below.

Figure 3:
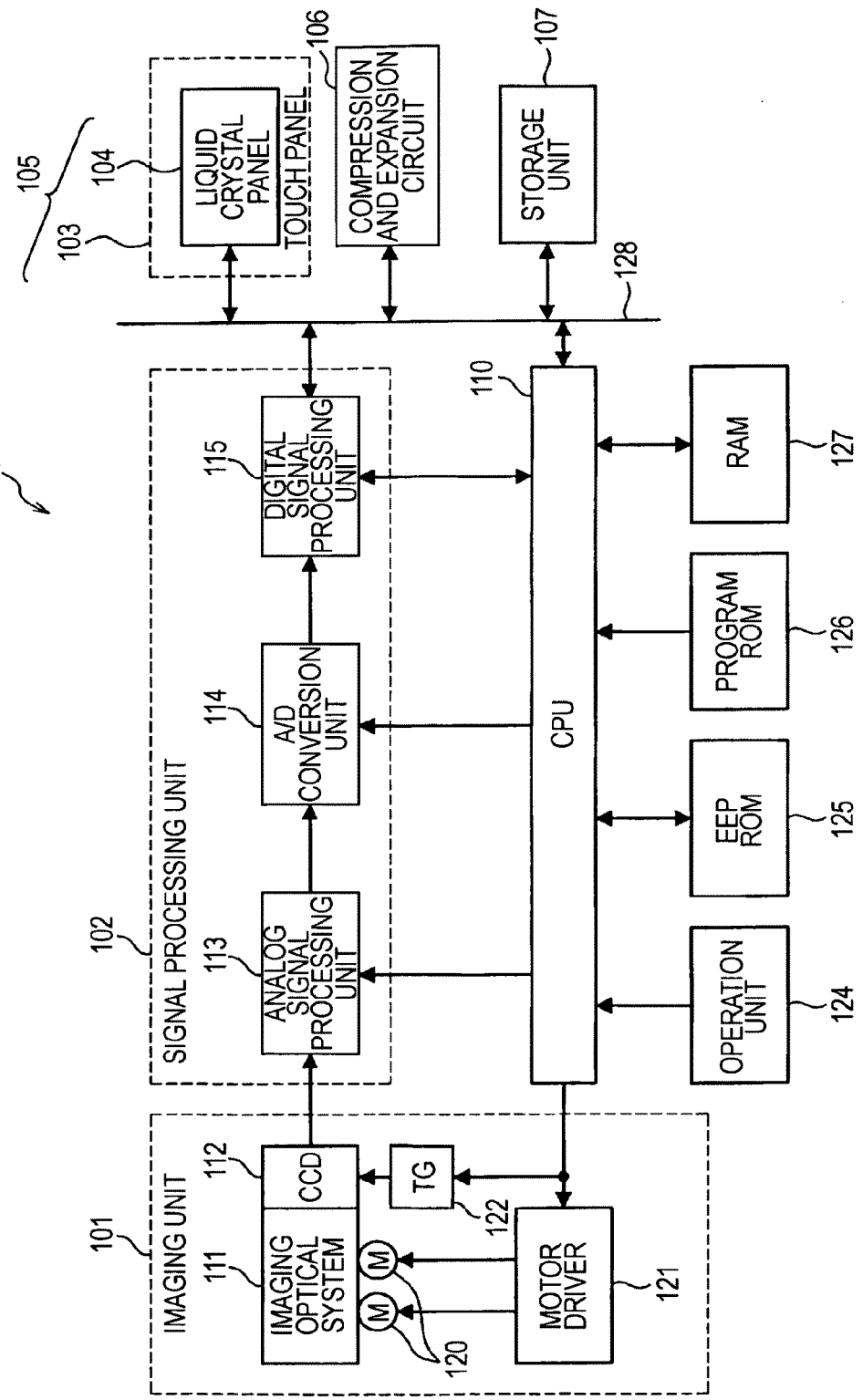
FIG. 3 is a block diagram illustrating a hardware configuration of an imaging device serving as a display control device according to the same embodiment.

1.3. Configuration of Display Control Device: Subsequently, with reference to FIG. 3, a hardware configuration of the display control device according to the present embodiment will be described in detail. FIG. 3 is a block diagram illustrating a hardware configuration of an imaging device 100 serving as the display control device according to the present embodiment.

As illustrated in FIG. 3, the imaging device 100 according to the present embodiment is configured as, for example, a digital video camera capable of imaging a subject and recording moving image content. The imaging device 100 includes an imaging unit 101, a signal processing unit 102, a touch screen 105, a compression and expansion circuit 106, a storage unit 107, a CPU (Central Processing Unit) 110, an operation unit 124, and memory units 125 to 127.

Among the above-described units, the imaging unit 101 causes an imaging optical system 111 to form a subject image on an image pickup device 112, and causes the image pickup device 112 to pick up the received subject image and output an image signal. Further, the signal processing unit 102 processes the image signal output from the image pickup device 112, to thereby generate image data (content) of the subject image. A touch panel 103, which is an example of an input unit according to an embodiment of the present invention, receives a selection operation (a user input) for selecting an item displayed on the above-described reproduction date selection screen 10. A liquid crystal panel 104, which is an example of a display unit with a display screen according to an embodiment of the present invention, displays the above-described reproduction date selection screen 10. The storage unit 107, which is an example of a storage unit according to an embodiment of the present invention, stores the imaged content, a data table holding the metadata of the content, and so forth. Further, the CPU 110 and the memory units 125 to 127, which are an example of a display control unit according to an embodiment of the present invention, control the respective units of the imaging device 100. Further, the CPU 110 and the compression and expansion circuit 106, which are an example of a reproduction unit according to an embodiment of the present invention, reproduce the content recorded in the storage unit 107. The respective units of the imaging device 100 will be described below.

The imaging optical system 111 is configured to include, for example, a lens group including a focus lens, a zoom lens, and so forth, a diaphragm, an optical filter, and other optical components. On an optical path of light incident from the subject through the imaging optical system 111, the image pickup device 112 is provided. The image pickup device 112 is formed by a solid-state image pickup device such as a CCD (Charge Coupled Device) and a C-MOS (Complementary Metal Oxide Semiconductor), for example. The image pickup device 112 photoelectrically converts an optical image focused on an image pickup surface thereof by the imaging optical system 111, and outputs an image signal.

On the basis of an instruction from the CPU 110, a motor driver 121 controls drive mechanisms 120 of the imaging unit 101 to drive the zoom lens, the focus lens, the diaphragm, and so forth. Thereby, the image of the subject is taken with appropriate focus, exposure, and so forth in accordance with the user operation performed on the operation unit 124 or the touch panel 103. Further, on the basis of an instruction from the CPU 110, a TG (Timing Generator) 122 controls the electronic shutter speed of the image pickup device 112. On the basis of a timing signal received from the TG 122, the image pickup device 112 reads and outputs an image signal according to the exposure amount.

The signal processing unit 102 includes an analog signal processing unit 113, an A/D (Analog-to-Digital) conversion unit 114, and a digital signal processing unit 115. The analog signal processing unit 113, which is a so-called analog front end for preprocessing an exposure image signal, includes a sample-hold circuit, an AGC (Automatic Gain Control) circuit, and so forth. For example, the analog signal processing unit 113 performs such processing as CDS (Correlated Double Sampling) processing and gain processing using a programmable gain amplifier (PGA) on the analog image signal output from the image pickup device 112. The A/D conversion unit 114 converts the analog image signal into a digital image signal. The digital signal processing unit 115 performs a variety of image signal processing (e.g., tone correction, shading correction, RGB-YUV conversion, frame interpolation processing, and frequency characteristic correction) on image signals (R, G, and B) received from the A/D conversion unit 114, to thereby generate image data. The image data generated by the above-described signal processing unit 102 is output to, for example, the liquid crystal panel 104, the compression and expansion circuit 106, or the storage unit 107.

The touch panel 103 is a transparent pressure-sensitive input device superimposed on a surface of the liquid crystal panel 104. The touch panel 103 and the liquid crystal panel 104 constitute the touch screen 105. The touch panel 103, which is an example of position specification reception means, receives an input operation performed by the user on an arbitrary position in the display screen. When the user taps the touch panel 103 by using a finger or a touch pen, the touch panel 103 detects the coordinates of the tapped position and outputs the coordinates to the CPU 110. As the position specification reception means, an arbitrary position detection device other than the touch panel 103 may be used, as long as the device can detect the specification of the position performed by the user in the picked-up image displayed on the display unit.

The liquid crystal panel 104 includes a display panel unit such as a liquid crystal display, and a display drive unit for driving the display panel unit to display data. The above-described display drive unit is formed by a pixel drive circuit for causing a variety of display data input via a bus 128 to be displayed on the above-described display panel unit. To respective pixels arranged in a matrix in the above-described display panel unit, the pixel drive circuit applies drive signals based on the image signals at respective predetermined horizontal and vertical drive timings, to thereby perform the display operation. Further, the display panel of the liquid crystal panel 104 may also include position specification reception means such as the above-described touch panel 103.

The compression and expansion circuit 106 performs compression and expansion processing, e.g., image compression and expansion processing according to the MPEG (Moving Picture Experts Group) format, on the image data input via the bus 128. To record the image data obtained by the imaging operation in the storage unit 107, the compression and expansion circuit 106 compresses the image data to reduce the stored data amount. Meanwhile, to reproduce the image data recorded in the storage unit 107, the compression and expansion circuit 106 expands the image data and transmits the expanded image data to the display unit of the liquid crystal panel 104 or the like.

The storage unit 107 is used to store content (image data and audio data) and a variety of other data. The storage unit 107 may be formed by a semiconductor memory such as a flash memory, or may be formed by an HDD (Hard Disk Drive) or the like, for example. Further, the storage unit 107 may be formed not by a recording medium provided in the imaging device 100 but by, for example, a recording and reproducing drive corresponding to a removable recording medium attachable to and detachable from the imaging device 100. The removable recording medium includes recording media such as a memory card with a built-in semiconductor memory, an optical disc, a magneto-optical disc, and a hologram memory, for example. As the optical disc, a CD (Compact Disc), a DVD (Digital Versatile Disc), a BD (Blu-ray Disc), and so forth can be used. The storage unit 107 may, of course, include both a built-in memory and a recording and reproducing drive for a removable recording medium. On the basis of the control of the CPU 110, the above-described storage unit 107 records and reproduces the image data input via the bus 128 and a variety of other data.

Herein, in the imaging operation, on the basis of the control of the CPU 110, the image data output from the signal processing unit 102 is supplied to the above-described compression and expansion circuit 106, and image data subjected to the compression processing by the compression and expansion circuit 106 is generated. Then, on the basis of the control of the CPU 110, the storage unit 107 records the compressed image data subjected to the compression processing in the recording medium. Further, in the imaging operation, the CPU 110 controls the image data output from the signal processing unit 102 to be supplied to the liquid crystal panel 104. In the imaging operation, therefore, the picked-up image data obtained from the image signal picked up by the image pickup device 112 is displayed in real time on the liquid crystal panel 104 (a live view image). Watching the live view image, the user can check the imaging range (the angle of field) and the state of the subject.

Further, if an instruction to reproduce the compressed image data recorded in the storage unit 107 is issued, the CPU 110 controls the storage unit 107 to read the compressed image data, and controls the compression and expansion circuit 106 to expand the compressed image data. Then, the CPU 110 controls the expanded image data to be displayed on the liquid crystal panel 104. Thereby, the compressed image data recorded in the storage unit 107 is reproduced and displayed.

The CPU 110 functions as a control unit which controls the respective units of the imaging device 100. The memory units 125 to 127, i.e., an EEPROM (Electrically Erasable Programmable ROM) 125, a program ROM (Read Only Memory) 126, and a RAM (Random Access Memory) 127, accompany the CPU 110.

The CPU 110 performs a variety of operation processing in accordance with a program stored in a memory unit such as the program ROM 126. The CPU 110 transmits control signals to respective units such as the imaging unit 101, the signal processing unit 102, the touch screen 105, the compression and expansion circuit 106, the storage unit 107, and the operation unit 124, to thereby cause the respective units to perform necessary operations. For example, the CPU 110 controls the liquid crystal panel 104 to display the above-described reproduction date selection screen 10 on the display screen thereof. Further, the CPU 110 performs a control to read from the storage unit 107 the content selected on the reproduction date selection screen 10, expand the compressed data of the content at the compression and expansion circuit 106 (reproduction processing of content), and display the expanded data on the liquid crystal panel 104. Further, in the imaging operation, the CPU 110 generates the metadata relating to the picked-up image data (content), and records the generated metadata in the storage unit 107 or the like as a data table.

A memory unit accompanying the CPU 110, such as the program ROM 126, stores a program for causing the CPU 110 to perform the above-described variety of control processing. On the basis of the program, the CPU 110 performs operation and control processing for performing the respective control operations described above.

The program according to the present embodiment is for causing the CPU 110 to perform the variety of control processing of the CPU 110 described above. The program can be previously stored in a storage device (e.g., a memory unit, an HDD, and a ROM) provided in the imaging device 100. Further, the program may be provided to the imaging device 100, as stored in a removable recording medium such as a memory card and an optical disc including a CD, a DVD, and a BD. Alternatively, the program may be downloaded to the imaging device 100 via a network such as a LAN (Local Area Network) and the Internet.

The operation unit 124 includes operating elements such as keys, buttons, and dials, for example. The operation unit 124 includes, for example, operating elements for instructing power-on and power off, operating elements for instructing the start and stop of the recording of a picked-up image, operating elements for zoom adjustment, and operating elements for instructing a variety of operations and inputting information. The operation unit 124 supplies the CPU 110 with information obtained from such operating elements, and the CPU 110 performs necessary operation processing and control corresponding to the information.

Figure 4:
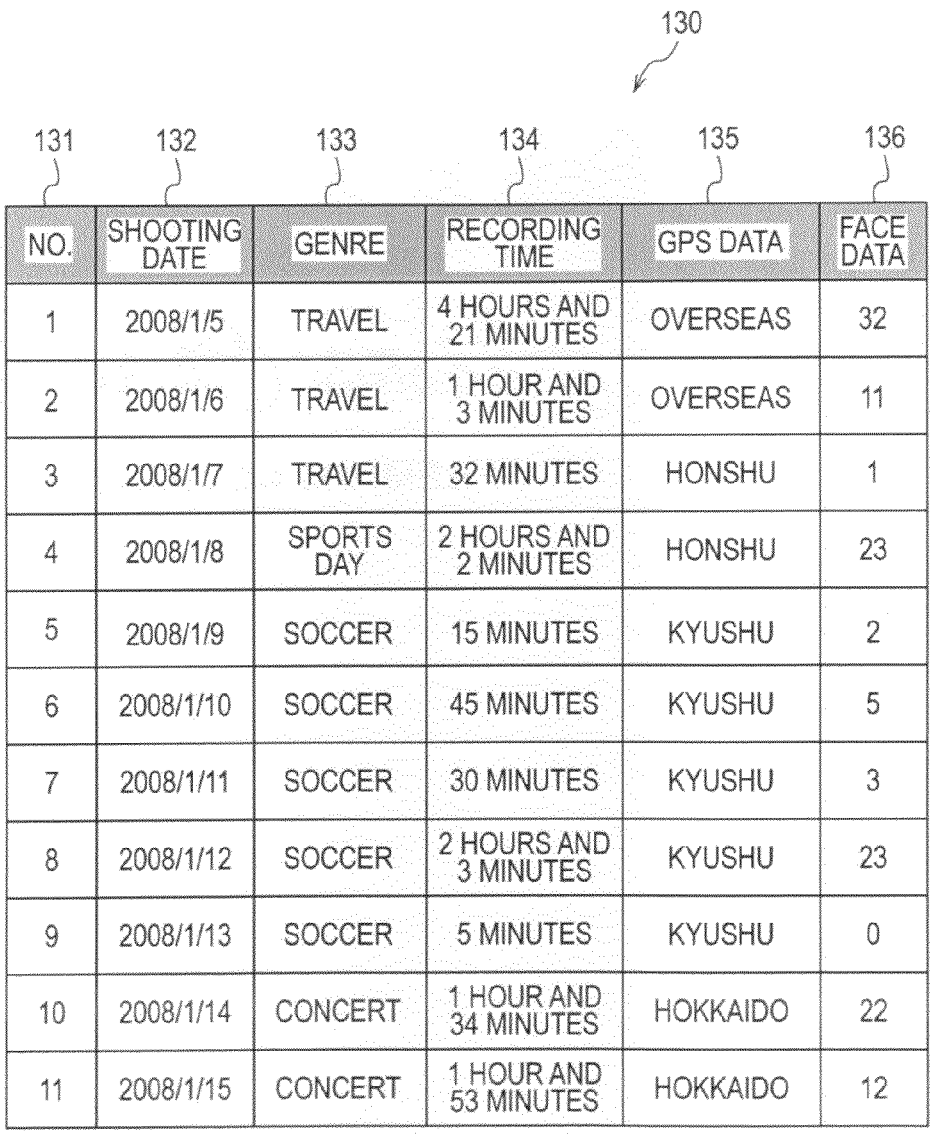
FIG. 4 is a schematic diagram illustrating a data table according to the same embodiment, which holds metadata of content.

1.4. Configuration of Data Table: Subsequently, with reference to FIG. 4, the data table according to the first embodiment of the present invention for holding the metadata of content will be described. FIG. 4 is a schematic diagram illustrating a data table 130 according to the present embodiment for holding the metadata of content.

As illustrated in FIG. 4, the data table 130 holds various types of metadata (attribute information) relating to the content items imaged by the imaging device 100 such that the metadata is associated with the respective content items. The data table 130 includes a plurality of rows and a plurality of columns. Each of the rows holds plural types of metadata (a data group) relating to one data item (content item) such that the metadata is associated with the data item. Each of the columns holds metadata (a data group) relating to one attribute of a plurality of content items.

The data table 130 holds, as the metadata of content, serial number 131, shooting date 132, genre 133, recording time 134, GPS (Global Positioning System) data 135, face data 136, and so forth. The serial number 131 refers to the identification numbers sequentially assigned to the respective content items (content identification information). The shooting date 132 refers to the dates on which the content items were imaged and recorded by the imaging device 100 (shooting date information). The genre 133 refers to the genres of the content items, such as travel, sports day, and concert, for example. Further, in the case of television broadcast program content, the genre of the content may be classified as, for example, sports, news, drama, movie, comedy, or the like. The recording time 134 refers to the recording times (corresponding to the reproduction times) of the content items. The GPS data 135 refers to the location information representing the shooting locations of the content items, such as latitude and longitude information obtained by GPS, for example. The face data 136 refers to the identification information of the face of a subject included in the image of a content item. The identification information is obtained by face recognition technology, for example. The metadata held by the data table 130 is not limited to the example of FIG. 4. Therefore, the data table 130 can also hold other arbitrary metadata.

The metadata of the data table 130 configured as described above is used to identify, classify, and reproduce the content items imaged and recorded by the imaging device 100. For example, in the selection and reproduction of content items from a plurality of content items, the range of content items to be reproduced can be selected as the date period with the use of a data group in the column of the shooting date 132 (a shooting date data group). The selection and reproduction of content items can also be similarly performed with the use of an attribute such as the genre 133, the GPS data 135 (the shooting location), and the face data 136. As described above, in the present embodiment, only content items satisfying a particular condition can be extracted from the multiple content items stored in the imaging device 100 by the use of the metadata of the data table 130 (a filtering function).

The start date selection area 11 and the end date selection area 12 in the reproduction date selection screen 10 of FIG. 2 described above are both associated with the data table 130 of FIG. 4. Further, each of the start date selection area 11 and the end date selection area 12 displays a list of data items (start dates or end dates) extracted from the data group in the column of the shooting date 132 (the date data group) of the data table 130. As described above, in the present embodiment, two data selection areas display the same type of data items extracted from the same data group of the data table 130. However, the present invention is not limited to the above-described example.

Figure 5:
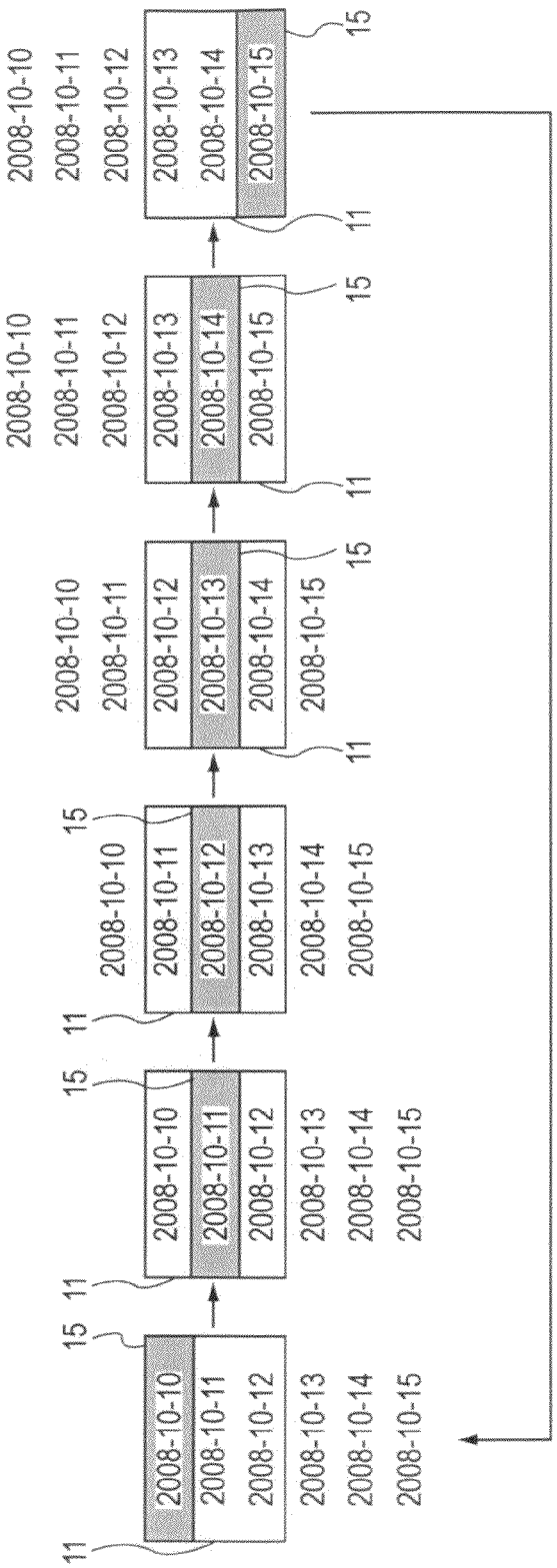
FIG. 5 is an explanatory diagram for explaining a scroll operation of a date list in a start date selection area according to the same embodiment.

1.5. Data Selection Method: Subsequently, with reference to FIGS. 2 and 4 described above and FIGS. 5 and 6, a content selection method using the GUI according to the present embodiment will be described in detail. FIG. 5 is an explanatory diagram for explaining a scroll operation of the date list in the start date selection area 11 according to the present embodiment. FIG. 6 is an explanatory diagram for explaining display operations of the scroll bars 21 and 22 according to the present embodiment.

Initial display of the reproduction date selection screen 10 will be first described. When the user inputs to the imaging device 100 an instruction to perform highlight reproduction, the liquid crystal panel 104 displays the reproduction date selection screen 10 as illustrated in FIG. 2. As described above, the reproduction date selection screen 10 of FIG. 2 includes the scroll bars 21 and 22 and the scroll areas 23 and 24, in addition to the start date selection area 11, the end date selection area 12, the up and down buttons 13 and 14, the central cursors 15 and 17, the selection area switch button 16, and the confirmation button 18, which are illustrated in FIG. 1.

In this case, the CPU 110 (corresponding to the display control unit) of the imaging device 100 controls the display content of the start date selection area 11 and the end date selection area 12 of FIG. 2 on the basis of the metadata contained in the data table 130 of FIG. 4. That is, the CPU 110 extracts, from the data table 130, the date data group in the column of the shooting date 132 representing the shooting dates of a plurality of content items imaged by the imaging device 100, and displays a list of the date data group in the start date selection area 11 as a start date list. The date data group is similarly displayed in the end date selection area 12 as an end date list.

In the start date selection area 11, all items of the date data group of the shooting date 132 in the data table 130 of FIG. 4 are displayed in a list as the start dates. Meanwhile, in the end date selection area 12, the start date selected by the central cursor 15 in the start date selection area 11 and the subsequent dates are displayed in a list as the end dates.

Subsequently, description will be made of a method of selecting the start date and the end date on the reproduction date selection screen 10 initially displayed as described above.

A method of selecting the start date will be first described. In accordance with the selection operation performed on the start date selection area 11 by the user, the CPU 110 selects the date adjusted to the central cursor 15 as the start date, while changing the display of the start date list in the start date selection area 11. As illustrated in FIG. 5, the user can select the start date by pressing the up button of the up and down buttons 13 in FIG. 2 and scrolling through the start date list to move backward through the dates. Meanwhile, the user can select the start date by pressing the down button of the up and down buttons 13 and scrolling through the start date list to move forward through the dates. The display position of the central cursor 15 is fixed. The user can select the start date by adjusting the date desired to be selected to the position of the central cursor 15. Further, the user can also scroll through the start date list and select the start date not by operating the up and down buttons 13 but by operating the scroll bar 21 accompanying the start date selection area 11. That is, if the user touches the scroll bar 21 and moves the scroll bar 21 up and down in the scroll area 23 to drag the scroll bar 21 to a desired position, the user can move the start date list up and down together with the scroll bar 21 to select the start date.

In the start date selection area 11, a list of all items of the date data group of the shooting date 132 in the data table 130 of FIG. 4 (the shooting dates of the content item No. 1 and the subsequent content items up to the last content item) is displayed as the start date list. Further, the CPU 110 holds, in the RAM 127, the address value in the data table 130 of the start date selected by the central cursor 15 in the start date selection area 11, as a date pointer. As the start date selected by the central cursor 15 is changed in accordance with the operation of the up and down buttons 13 or the scroll bar 21, the date pointer is also changed.

Subsequently, a method of selecting the end date will be described. The user first presses the selection area switch button 16. Then, the CPU 110 activates the end date selection area 12. Thereby, the end date selection area 12 is brought into a state in which the end date can be selected in accordance with the selection operation performed on the up and down buttons 14 or the scroll bar 22.

Then, in accordance with the selection operation performed on the end date selection area 12 by the user, the CPU 110 selects the date adjusted to the central cursor 17 as the end date, while changing the display of the end date list in the end date selection area 12. Similarly as in the selection of the start date described above, the user can select the end date by pressing the up and down buttons 14 of FIG. 2 and scrolling through the end date list to adjust the date desired to be selected to the position of the central cursor 17. Further, similarly as in the case of the start date, the user can also scroll up and down through the end date list and select the end date by operating the scroll bar 22 accompanying the end date selection area 12.

The end date selection area 12 displays, as the end date list, a list of the start date selected in the above-described start date selection area 11 and the subsequent dates. The CPU 110 refers to the date pointer corresponding to the above-described start date, extracts the date data of the date indicated by the date pointer and the subsequent dates from the date data group of the shooting date 132 in the data table 130 of FIG. 4, and displays the extracted date data in the end date selection area 12 as the end date list.

That is, it is not allowed to set the end date to be prior to the start date. Therefore, a date list of the period from "the date selected as the start date" to "the last date" is displayed as the end date list of the end date selection area 12, and the dates prior to the start date are not displayed. Therefore, the user can perform an operation of selecting the end date from the date list of the above-described period. For example, a case is now assumed in which the column of the shooting date 132 of the data table 130 includes the dates from "2008/Oct./10" to "2008/Oct./15," as illustrated in FIG. 5. In this case, if "2008/Oct./12" is selected as the start date, the dates selectable in the end date list are from "2008/Oct./12" to "2008/Oct./15."

With reference to FIG. 6, description will now be made of the display mode (e.g., the display position and the size) of the scroll bars 21 and 22 in the selection of the start date and the end date as described above.

The display position of the scroll bars 21 and 22 will be first described. As illustrated in (A) of FIG. 6, if the first date of the date data group of the shooting date 132 in the data table 130 (the shooting date of the content item No. 1 in FIG. 4) is selected as the start date, the display position of the scroll bar 21 is located at the upper end of the scroll area 23. Further, as illustrated in (B) of FIG. 6, as the shooting date of the content item No. 2 or a subsequent content item of the above-described date data group is selected as the start date, the display position of the scroll bar 21 moves toward the lower end of the scroll area 23. Further, as illustrated in (C) of FIG. 6, if the shooting date at the lower end (the last date) is selected, the display position of the scroll bar 21 is located at the lower end of the scroll area 23. The same applies to the display position of the scroll bar 22 in the scroll area 24.

Subsequently, the size of the scroll bars 21 and 22 will be described. As illustrated in FIG. 6, the size of the scroll bars 21 and 22 changes in accordance with the number of items (the number of data items) of the date list displayed in the start date selection area 11 and the end date selection area 12. For example, if the number of items of the start date list displayed in the start date selection area 11 is α, the size of the scroll bar 21 is displayed in a size corresponding to the quotient resulting from the division of the scroll area 23 by the value α. The same applies to the size of the scroll bar 22.

Therefore, as the number of items of the date list displayed in the start date selection area 11 and the end date selection area 12 is increased, the size of the scroll bars 21 and 22 is reduced. Meanwhile, as the number of items of the date list is reduced, the size of the scroll bars 21 and 22 is increased. In this case, the end date selection area 12 displays, as the end date list, a list of the start date selected in the start date selection area 11 and the subsequent dates. Therefore, the size of the scroll bar 22 is displayed in a size equal to or larger than the size of the scroll bar 21.

That is, as described above, the start date is selectable from all dates of the date data group in the column of the shooting date 132 of the data table 130, while the end date is not selectable from the dates prior to the selected start date. Therefore, the display of the scroll bar 22 in the end date selection area 12 is controlled such that the scroll bar 22 has a size corresponding to the date period (the range of the number of data items) selectable as the end dates. Meanwhile, the start date selection area 11 typically displays a list of all dates of the date data group of the data table 130. Therefore, the size of the scroll bar 21 in the start date selection area 11 is maintained to be constant.

For example, as illustrated in (A) of FIG. 6, if the first date is selected as the start date, the number of items displayed in the start date selection area 11 and the number of items displayed in the end date selection area 12 are the same. Therefore, the size of the scroll bar 21 and the size of the scroll bar 22 are the same. Further, as illustrated in (B) of FIG. 6, if a date located at a chronologically central position in the above-described shooting date data group is selected as the start date, the number of items displayed in the end date selection area 12 is reduced by half. Therefore, the size of the scroll bar 22 is approximately twice as large as the size of the scroll bar 21. Further, as illustrated in (C) of FIG. 6, if the shooting date at the lower end (the last date) is selected, the number of items displayed in the end date selection area 12 is only one. Therefore, the size of the scroll bar 22 corresponds to the size of the entire scroll area 23.

As described above, the CPU 110 changes the display mode of the scroll bars 21 and 22 in accordance with the number of items of the date list displayed in the start date selection area 11 and the end date selection area 12 and the selected start date. Accordingly, the user can easily grasp the number of items of the date list displayed in the start date selection area 11 and the end date selection area 12 and the position in the list (the display order) of the date currently selected in the date list.

Subsequently, a usage example of the reproduction date selection screen 10 described above will be described. For example, a case is now assumed in which the user wants to select and reproduce content items corresponding to a date period approximately one-third of the entire date list from the multiple content items stored in the imaging device 100. In this case, in the start date selection operation, the user first presses the up and down buttons 13 or touches and drags the scroll bar 21 to adjust the date desired to be selected as the start date to the central cursor 15. To clarify the effect of the GUI according to the present embodiment, it is herein assumed that the oldest one of the shooting dates of the above-described multiple content items has been selected as the start date.

Then, the user presses the selection area switch button 16 to move to the end date selection operation. In this case, the oldest shooting date has been selected as the start date, as described above. Therefore, the end date selection area 12 displays a date list of all content items stored in the imaging device 100. Herein, if the user wants to reproduce the content items corresponding to the date period from the above-described oldest shooting date to the date located at a position approximately one-third of the entire date list, the user drags the scroll bar 22 downward from the upper end of the scroll area 24 to a position approximately one-third of the scroll area 24. Thereby, the end date selection area 12 displays a date list of dates near the date located at the position approximately one-third of the entire date list. Therefore, with the use of the up and down buttons 14, the user adjusts a desired date of the date list to the central cursor 17 to select the end date.

With the above-described operation, the user can easily and promptly select, as the content items to be reproduced, the content items imaged during a desired date period from the multiple content items stored in the imaging device 100. The imaging device 100 performs sequential reproduction (e.g., highlight reproduction and slideshow reproduction) of the content items corresponding to the selected date period, and displays the content items on the liquid crystal panel 104.

Figure 7A:
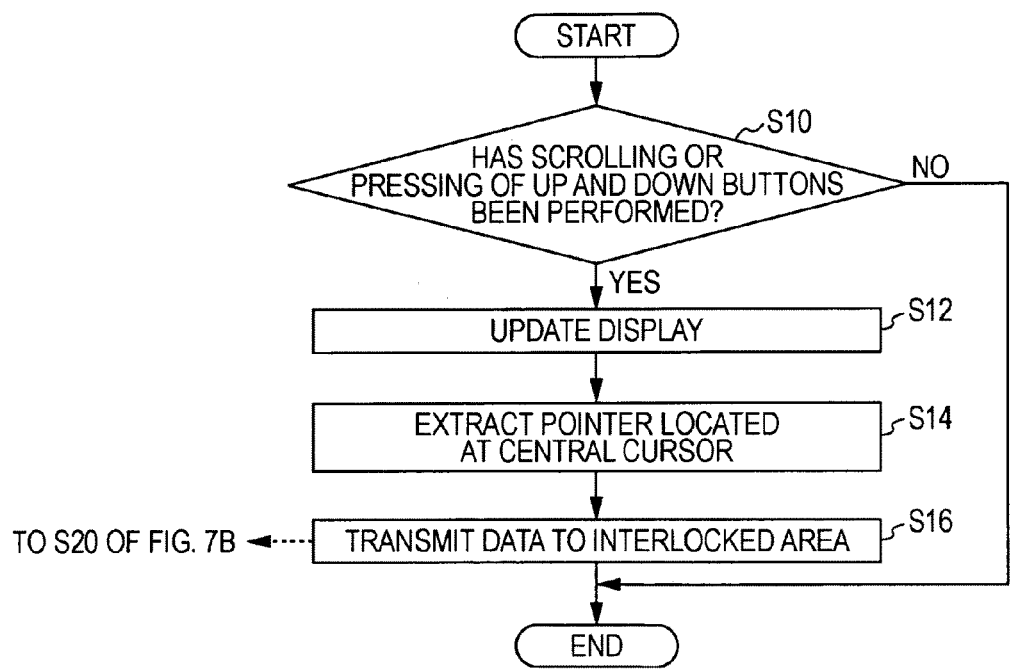
FIG. 7A is a flowchart illustrating a display control operation of the start date selection area on the reproduction date selection screen according to the same embodiment.
Figure 7B:
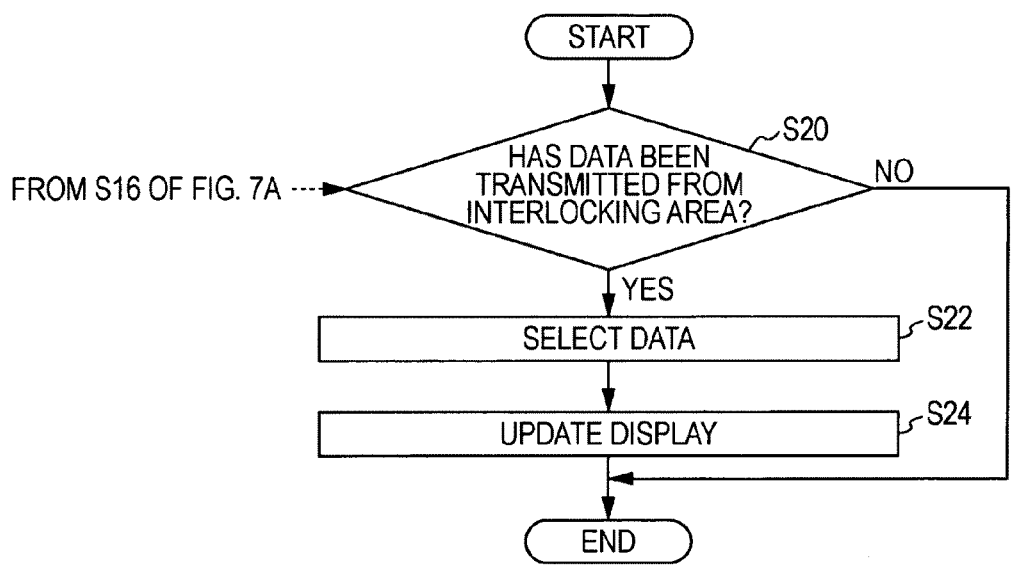
FIG. 7B is a flowchart illustrating a display control operation of an end date selection area on the reproduction date selection screen according to the same embodiment.

1.6. Display Control Operation Flow: Subsequently, with reference to FIGS. 7A and 7B, description will be made of a display control operation of the reproduction date selection screen 10 by the imaging device 100 according to the present embodiment. FIGS. 7A and 7B are flowcharts illustrating the display control operation of the reproduction date selection screen 10 by the imaging device 100 according to the present embodiment.

As described above, on the reproduction date selection screen 10, the user performs an operation of selecting the start date by operating the up and down buttons or the scroll bar 21. Then, in conjunction with the selection operation, the CPU 110 changes in real time the end date list displayed in the end date selection area 12 and the display mode of the scroll bar 22. Such a display control method interlocking the start date with the end date can be realized by, for example, the routines illustrated in FIGS. 7A and 7B. The routine of FIG. 7A is for controlling the display of the start date selection area 11 serving as the interlocking side. The routine of FIG. 7B is for controlling the display of the end date selection area 12 serving as the interlocked side. To realize the routines of FIGS. 7A and 7B, the CPU 110 executes a program for performing the operations of the respective routines. FIGS. 7A and 7B only illustrate the interlocking processing of the routines. The routine of FIG. 7A is performed in a predetermined period on the interlocking side, and the routine of FIG. 7B is performed in a predetermined period on the interlocked side. The routines illustrated in FIGS. 7A and 7B will be described in detail below.

With reference to FIG. 7A, description will be first made of the display control routine of the start date selection area 11 being an interlocking area. As illustrated in FIG. 7A, at Step S10, the CPU 110 first determines whether or not the start date selection operation has been performed in the start date selection area 11, i.e., whether or not the operation of the up and down buttons 13 or the scroll bar 21 has been performed. If the selection operation has not been performed (NO at Step S10), the entire routine of FIG. 7A is completed. Therefore, if the operation of the up and down buttons 13 or the scroll bar 21 has not been performed, any processing relating to the interlocking display control has not been performed. Thus, there is no change in the display content of the start date list of the start date selection area 11.

Meanwhile, if the selection operation using the up and down buttons 13 or the scroll bar 21 has been performed at Step S10 (YES at Step S10), the procedure proceeds from Step S10 to Step S12. At this Step S12, the CPU 110 updates the start date list displayed in the start date selection area 11, and updates the display position of the scroll bar 21. That is, as illustrated in FIG. 5, in accordance with the user operation on the up and down buttons 13 or the scroll bar 21, the CPU 110 performs scroll display of the start date list displayed in the start date selection area 11. As a result, the date adjusted to the central cursor 15 is selected as the start date. Further, the CPU 110 changes the display position of the scroll bar 21 in the scroll area 23 in accordance with the position of the start date list displayed in the start date selection area 11.

Then, at Step S14, the CPU 110 extracts the identification information of the start date (the date pointer) selected in the start date selection area 11. For example, from the address values included in the date data group of the shooting date 132 of the data table 130, the CPU 110 extracts, as the date pointer, the address value of the date corresponding to the start date adjusted to the position of the above-described central cursor 15. The date pointer corresponds to the information representing the result of selection of the start date (the first data item) in the start date selection area 11 (the first selection area).

Thereafter, at Step S16, the CPU 110 transmits the date pointer extracted at Step S14 as the data for display control of the end date selection area 12 as the interlocked side (FIG. 7B). Thereafter, the routine of FIG. 7A is completed.

As described above, according to the routine of FIG. 7A, upon every operation of the up and down buttons 13 or the scroll bar 21, the date pointer of the start date located at the central cursor 15 is transmitted as the data for display control of the end date selection area 12 as the interlocked side.

Subsequently, with reference to FIG. 7B, detailed description will be made of the display control routine of the end date selection area 12 being an interlocked area. As illustrated in FIG. 7B, at Step S20, the CPU 110 first determines whether or not the data transmitted at Step S16 in the routine of FIG. 7A described above, i.e., the date pointer of the start date has been transmitted. If the date pointer has not been transmitted (NO at Step S20), the entire routine of FIG. 7B is completed. Therefore, if the operation of the up and down buttons 13 or the scroll bar 21 has not been performed in the start date list selection described above, any processing relating to the interlocking display control has not been performed. Thus, there is no change in the display content of the end date list in the end date selection area 12.

Meanwhile, if the date pointer has been transmitted at Step S20 (YES at Step S20), the procedure proceeds from Step S20 to Step S22. At this Step S22, on the basis of the transmitted date pointer, the CPU 110 selects the date data group in the column of the shooting date 132 of the data table 130, and extracts the date data of the date corresponding to the date pointer and the subsequent dates, as the end date list displayed in the end date selection area 12. Specifically, on the basis of the above transmitted date pointer, the CPU 110 specifies the start date of the end date list displayed in the end date selection area 12 and the number of displayed items of the end date list. The start date of the end date list corresponds to the date indicated by the date pointer transmitted at Step S16 in the routine of FIG. 7A. Further, the number of displayed items of the end date list corresponds to the total number of the date indicated by the date pointer and the subsequent dates in the date data group of the data table 130. For example, in the example of the data table 130 in FIG. 4, if the date pointer points "2008/Jan./9," which is the shooting date of the content item No. 5, the start date of the end date list is "2008/Jan./9," i.e., the shooting date of the content item No. 5. Further, the number of displayed items of the end date list corresponds to the total number of date data items from the start date to the date data item at the lower end of the data table 130.

Thereafter, at Step S24, in accordance with the result of selection at Step S22, the CPU 110 updates the display content of the end date list in the end date selection area 12, and updates the display mode (the display position and the size) of the scroll bar 22. Specifically, on the basis of the start date of the end date list obtained at Step S22, the CPU 110 updates the display of the end date list in the end date selection area 12. Further, the CPU 110 updates the display mode of the scroll bar 22 by using the number of displayed items of the end date list obtained at Step S22. In the display control of the scroll bar 22, the size of the scroll bar 22 is changed in accordance with the number of displayed items of the end date list. Therefore, with the use of the value α representing the number of displayed items of the end date list obtained at Step S22, the CPU 110 calculates the size corresponding to the quotient resulting from the division of the scroll area 24 by the value α. Then, the CPU 110 updates the display such that the scroll bar 22 has the above-described size resulting from the division with the value α. For example, if the number of displayed items of the end date list is "10," the scroll bar 22 has a size corresponding to the quotient resulting from the division of the scroll area 24 by ten. The display start position of the scroll bar 22 is the upper end of the scroll area 24.

After the displayed items of the end date list in the end date selection area 12 and the display mode of the scroll bar 22 are updated in the above-described manner, the entire processing of the routine in FIG. 7B is completed.

In the above, the display control processing according to the present embodiment has been described with reference to FIGS. 7A and 7B. According to the above-described display control processing, the display content of the end date list in the end date selection area 12 and the display mode of the scroll bar 22 are changed in accordance and conjunction with the selection operation of the start date in the start date selection area 11. Therefore, the user can easily grasp the number of items of the end date list displayed in the end date selection area 12 and the currently selected end date, and can also easily and promptly select a desired end date from the end date list.

In the above, the display control device and the display control method according to the first embodiment of the present invention have been described. According to the present embodiment, if the user operates the scroll bars 21 and 22 on the above-described reproduction date selection screen 10 displayed on the imaging device 100, for example, the user can more smoothly select items from the date lists. Further, upon selection of the start date, the end date selection area 12 displays a list of end dates corresponding to the selected start date and the subsequent dates. Therefore, the user can easily select the end date without performing an extra operation. Further, the size and the display position of the scroll bars 21 and 22 are changeable in accordance with the number of items of the corresponding date list. On the basis of the size and the display position of the scroll bars 21 and 22, therefore, the user can easily grasp the display range of the date list. Further, on the basis of the size of the scroll bars 21 and 22, the user can also easily grasp the number of items of the date list.

2. Second Embodiment

Subsequently, a second embodiment of the present invention will be described. The second embodiment is different from the first embodiment described above in that mutually different types of data items are selected with the use of a plurality of selection areas, and is similar to the first embodiment in the other parts of the functional configuration. Therefore, detailed description thereof will be omitted.

2.1. Summary of GUI according to Second Embodiment: In the first embodiment described above, description has been made of the example of the reproduction date selection screen used as a data selection screen of a GUI to select the start date and the end date, which are the same types of data items, to specify the date period of the content items to be subjected to highlight reproduction by the imaging device 100. In the second embodiment, description will be made of an application example of a data selection screen for selecting content items to be reproduced by the use of mutually different types of metadata included in plural types of metadata stored in the data table 130 described above.

For example, as described in the following cases (1) to (4), with the use of two or more different types of metadata stored in the data table 130 of FIG. 4, the content items to be reproduced can be filtered (narrowed down) from the multiple content items stored in the imaging device 100.

(1) Narrowing down of content items to be reproduced with the use of the shooting date 132 and the genre 133 as the filtering conditions.

(2) Narrowing down of content items to be reproduced with the use of the shooting date 132 and the GPS data 135 as the filtering conditions.

(3) Narrowing down of data items to be reproduced with the use of the genre 133 and the GPS data 135 as the filtering conditions.

(4) Narrowing down of data items to be reproduced with the use of the face data 136 and one of the shooting date 132, the genre 133, and the GPS data 135 as the filtering conditions.

The above-described cases (1) to (4) present an example of narrowing down of content items with the use of two types of metadata items included in five types of metadata items in the example of the data table 130 illustrated in FIG. 4. If a plurality of selection areas can be simultaneously displayed on a single screen, however, narrowing down of data using three or more types of data items can also be performed. A data selection method using a data selection screen enabling such selection of plural types of mutually different data items will be described below.

Figure 8:
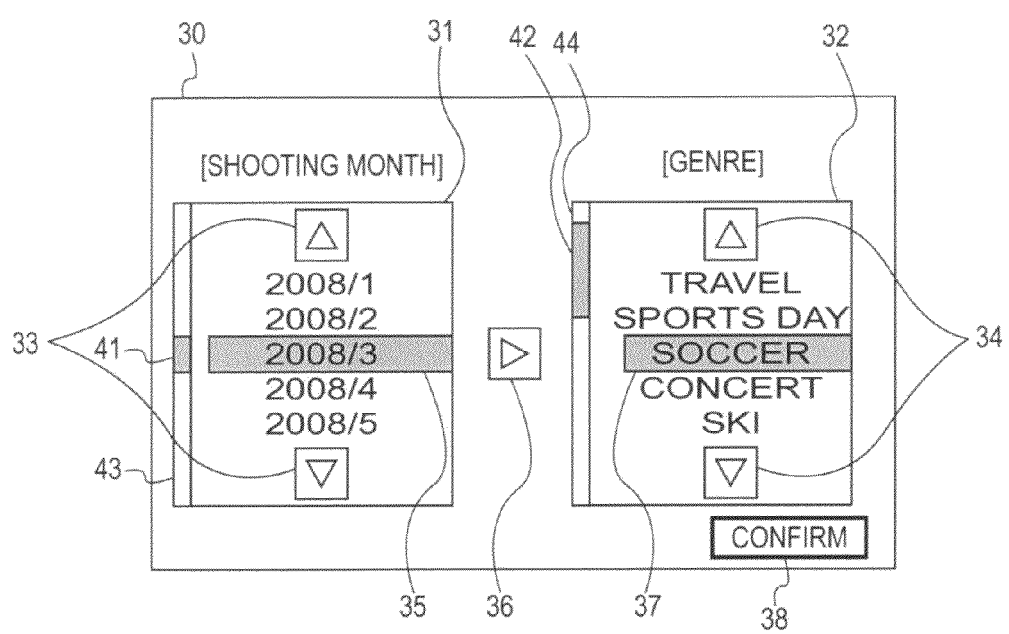
FIG. 8 is a schematic diagram illustrating a display example of a data selection screen according to a second embodiment of the present invention.

2.2. Example of Data Selection Screen: With reference to FIG. 8, a GUI for data selection according to the second embodiment of the present invention will be first described. FIG. 8 is a schematic diagram illustrating a display example of a data selection screen 30 according to the present embodiment. FIG. 8 illustrates an example of the data selection screen 30 for selecting "shooting month" as the first data item and "genre" as the second data item.

As illustrated in FIG. 8, the liquid crystal panel 104 of the imaging device 100 according to the second embodiment displays the data selection screen 30, which is a GUI for data selection. The data selection screen 30 of FIG. 8 includes a shooting month selection area 31 (a first selection area), a genre selection area 32 (a second selection area), up and down buttons 33 and 34, central cursors 35 and 37, a selection area switch button 36, and a confirmation button 38. For example, the shooting month selection area 31 is a list box displaying a list of months (first data items) in which the content items were imaged, and the genre selection area 32 is a list box displaying a list of genres (second data items) of the content items.

Further, similarly to the reproduction date selection screen 10 of FIG. 2, the data selection screen 30 of FIG. 8 includes a scroll bar 41 (a first scroll bar) corresponding to the shooting month selection area 31 (the first selection area) and a scroll bar 42 (a second scroll bar) corresponding to the genre selection area 32 (the second selection area). The above-described scroll bars 41 and 42 are provided to one side of the shooting month selection area 31 and one side of the genre selection area 32, respectively, to be movable in the up and down directions in scroll areas 43 and 44, respectively. In GUI components of the above-described data selection screen 30, the first data item selected in the first selection area is the "shooting month," and the second data item selected in the second selection area is the "genre." Except for these items, the GUI components of the data selection screen 30 are similar in functional configuration to the GUI components of the reproduction date selection screen 10 illustrated in FIG. 2. Therefore, detailed description thereof will be omitted.

In the data selection screen 30 as described above, the user operates the up and down buttons 33 or the scroll bar 41 to select at least one shooting month from a shooting month list displayed as a list in the shooting month selection area 31. Then, in conjunction with the above-described shooting month selection operation and in accordance with the selected shooting month, the CPU 110 (a display control unit) of the imaging device 100 changes the display content of a genre list displayed as a list in the genre selection area 32 and the display mode of the scroll bar 42.

That is, in the narrowing down of content items to be reproduced with the use of the shooting month and the genre as the metadata of content, upon selection of the shooting month of the content items, the genres of the content items to be reproduced are narrowed down to the genres corresponding to the content items imaged in the selected shooting month. In the example of FIG. 8, "2008/March" is selected as the shooting month. Therefore, the genres of the content items to be reproduced are narrowed down to the genres corresponding to the content items imaged in "2008/March." Accordingly, the CPU 110 selects (filters) the genres in accordance with the shooting month selected in the shooting month selection area 31, and displays a list of the selected genres in the genre selection area 32. That is, from a genre data group in the column of the genre 133 of the data table 130, the CPU 110 extracts genre data corresponding to the content items imaged in the shooting month selected in the shooting month selection area 31, and displays a list of the genre data in the genre selection area 32. Thereby, the genre selection area 32 displays not all data of the genre data group present in the column of the genre 133 of the data table 130 but a list of only the genre data imaged in the above-selected shooting month. Accordingly, it is possible to narrow down the genres displayed as options in the genre selection area 32 to only actually selectable genres and reduce the number of items (the number of displayed items) of the genre list. In the genre selection area 32, therefore, the user can easily find and select a desired genre of the content items imaged in the shooting month.

In addition, in conjunction with the shooting month selection operation in the shooting month selection area 31, the CPU 110 changes the display mode (e.g., the size and the display position) of the scroll bar 42 in the genre selection area 32. Specifically, the CPU 110 selects the genres in the above-described manner in accordance with the shooting month selected in the shooting month selection area 31, and changes the size of the scroll bar 42 in accordance with the number of the selected genres. Further, the CPU 110 changes the display position of the scroll bar 42 in the scroll area 44 in accordance with the position in the list (the display order) of the genre currently selected by the central cursor 37 from the above-selected genres. Accordingly, if the user checks the changed size and display position of the scroll bar 42, the user can easily grasp the number of the genres displayed in a list in the genre selection area 32 and the position in the list of the currently selected genre. Therefore, the user can more easily find and select the desired genre in the genre selection area 32.

In the above, the GUI using the data selection screen 30 according to the present embodiment has been described. According to the present embodiment, the shooting month selection area 31 (the first selection area) and the genre selection area 32 (the second selection area) display different types of data items (i.e., the shooting month and the genre) associated with the content items. In this case, in conjunction with the shooting month selection operation in the shooting month selection area 31, the present embodiment changes the display content of the genre list in the genre selection area 32 and the display mode of the scroll bar 42.

According to the present embodiment, with the operation of the scroll bars 41 and 42 on the above-described data selection screen 30, for example, the user can more smoothly select items from the shooting month list and the genre list. Further, upon selection of the shooting month, the genre selection area 32 displays a list of the genres of the content items imaged in the selected shooting month. Therefore, the user can easily select the genre without performing an extra operation. Further, the size and the display position of the scroll bar 42 are changeable in accordance with the number of genre items. On the basis of the size and the display position of the scroll bar 42, therefore, the user can easily grasp the display range of the genre list. Further, on the basis of the size of the scroll bar 42, the user can also easily grasp the number of items of the genre list.

Figure 9:
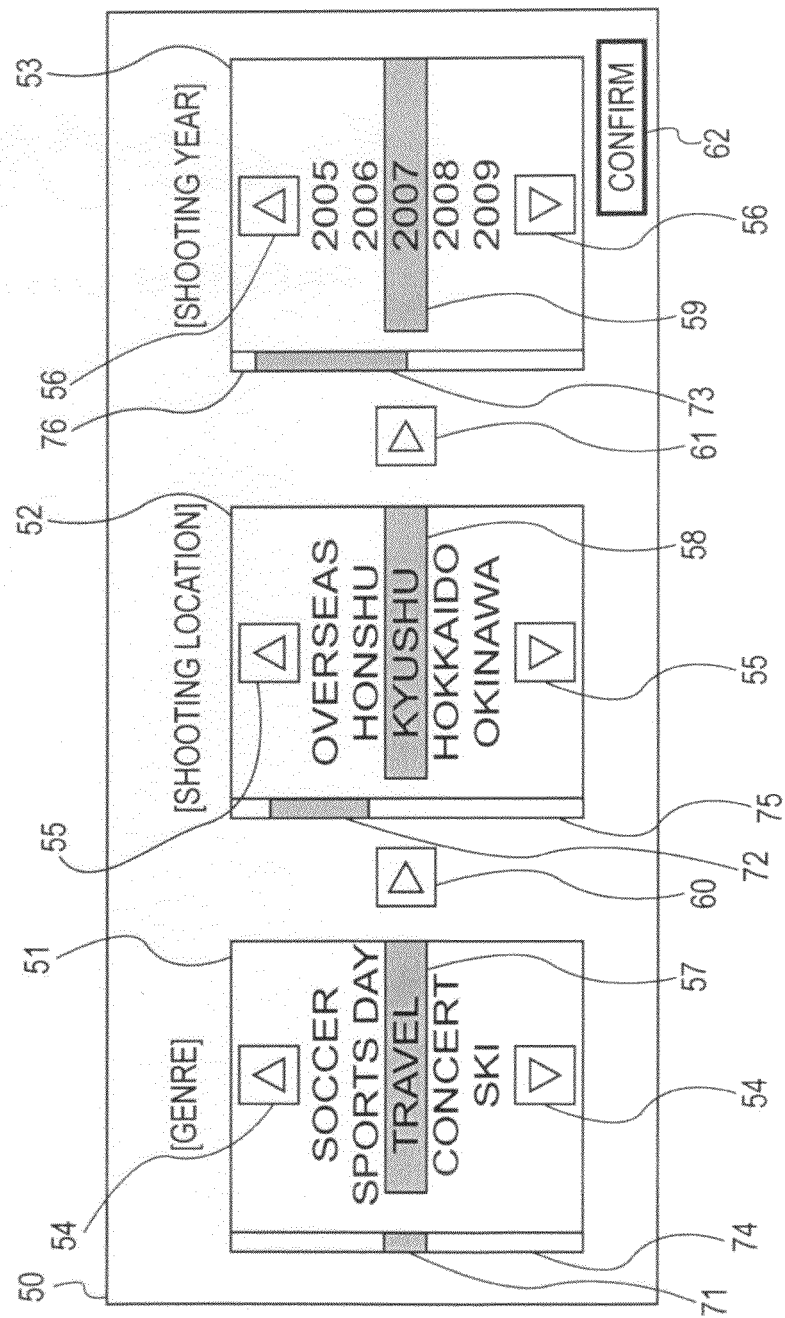
FIG. 9 is a schematic diagram illustrating a display example of a data selection screen according to a modified example of the same embodiment.

2.3. Modified Example of Data Selection Screen: Subsequently, with reference to FIG. 9, a GUI for data selection according to a modified example of the second embodiment of the present invention will be described. FIG. 9 is a schematic diagram illustrating a display example of a data selection screen 50 according to the modified example of the present embodiment. FIG. 9 illustrates an example of the data selection screen 50 for selecting "genre" as the first data item, "shooting location" as the second data item, and "shooting year" as the third data item.

As illustrated in FIG. 9, the liquid crystal panel 104 of the imaging device 100 according to the modified example of the second embodiment displays the data selection screen 50, which is a GUI for data selection. The data selection screen 50 of FIG. 9 includes a genre selection area (a first selection area), a shooting location selection area 52 (a second selection area), a shooting year selection area 53 (a third selection area), up and down buttons 54, 55, and 56, central cursors 57, 58, and 59, selection area switch buttons 60 and 61, and a confirmation button 62. The genre selection area 51 is a list box displaying a list of genres (first data items) of the content items. The shooting location selection area 52 is a list box displaying a list of locations (second data items) where the content items were imaged. The shooting year selection area 53 is a list box displaying a list of years (third data items) in which the content items were imaged.

Further, similarly to the reproduction date selection screen 10 of FIG. 2, the data selection screen 50 of FIG. 9 includes a scroll bar 71 (a first scroll bar) corresponding to the genre selection area 51 (the first selection area), a scroll bar 72 (a second scroll bar) corresponding to the shooting location selection area 52 (the second selection area), and a scroll bar 73 (a third scroll bar) corresponding to the shooting year selection area 53 (the third selection area). The above-described scroll bars 71, 72, and 73 are provided to one side of the genre selection area 51, one side of the shooting location selection area 52, and one side of the shooting year selection area 53, respectively, to be movable in the up and down directions in scroll areas 74, 75, and 76, respectively. In GUI components of the above-described data selection screen 50, the first data item selected in the first selection area is the "genre," and the second data item selected in the second selection area is the "shooting location." Further, the "shooting year" as the third data item is selectable in the third selection area. Except for these items, the GUI components of the data selection screen 50 are similar in functional configuration to the GUI components of the reproduction date selection screen illustrated in FIG. 2. Therefore, detailed description thereof will be omitted.

In the data selection screen 50 as described above, the user operates the up and down buttons 54 or the scroll bar 71 to select at least one genre from a genre list displayed as a list in the genre selection area 51. Then, in conjunction with the above-described genre selection operation and in accordance with the selected genre, the CPU 110 changes the display content of a shooting location list displayed as a list in the shooting location selection area 52 and the display mode of the scroll bar 72. Further, the user operates the up and down buttons 55 or the scroll bar 72 to select at least one shooting location from the shooting location list displayed as a list in the shooting location selection area 52. Then, in conjunction with the above-described shooting location selection operation and in accordance with the selected shooting location, the CPU 110 changes the display content of a shooting year list displayed as a list in the shooting year selection area 53 and the display mode of the scroll bar 73.

That is, in the narrowing down of content items to be reproduced with the use of the genre, the shooting location, and the shooting year as the metadata of content, upon selection of the genre of the content items, the shooting locations of the content items to be reproduced are narrowed down to the shooting locations corresponding to the content items of the selected genre. In the example of FIG. 9, "travel" is selected as the genre. Therefore, the shooting locations of the content items to be reproduced are narrowed down to the shooting locations of the content items, the genre of which is the "travel." Then, the CPU 110 selects (filters) the shooting locations in accordance with the genre selected in the genre selection area 51, and displays a list of the selected shooting locations in the shooting location selection area 52. That is, from a shooting location data group in the column of the GPS data 135 of the data table 130, the CPU 110 extracts the shooting location data corresponding to the content items of the genre selected in the genre selection area 51, and displays a list of the shooting location data in the shooting location selection area 52. Thereby, the shooting location selection area 52 displays not all data of the shooting location data group present in the column of the GPS data 135 in the data table 130 but a list of only the shooting location data of the content items of the above-selected genre. Therefore, it is possible to narrow down the shooting locations displayed as options in the shooting location selection area 52 to only actually selectable shooting locations and reduce the number of items (the number of displayed items) of the shooting location list. In the shooting location selection area 52, therefore, the user can easily find and select the content items corresponding to a desired shooting location from the content items corresponding to the above-described genre.

In addition, in conjunction with the genre selection operation in the genre selection area 51, the CPU 110 changes the display mode (e.g., the size and the display position) of the scroll bar 72 in the shooting location selection area 52 in a similar manner as in the above-described example. Accordingly, if the user checks the changed size and display position of the scroll bar 72, the user can easily grasp the number of the shooting locations displayed in a list in the shooting location selection area 52 and the position in the list of the currently selected shooting location. In the shooting location selection area 52, therefore, the user can more easily find and select the desired shooting location.

Further, upon selection of the shooting location of the content items in the shooting location selection area 52, the shooting years of the content items to be reproduced are narrowed down to the shooting years corresponding to the content items of the above-selected genre and shooting location. In the example of FIG. 9, "Kyushu" is selected as the shooting location. Therefore, the shooting years of the content items to be reproduced are narrowed down to the shooting years corresponding to the content items, the genre and the shooting location of which are "travel" and "Kyushu," respectively. Then, the CPU 110 selects (filters) the shooting years in accordance with the shooting location selected in the shooting location selection area 52, and displays a list of the selected shooting years in the shooting year selection area 53. Thereby, the shooting year selection area 53 displays not all shooting years represented by the shooting date data group present in the column of the shooting date 132 of the data table 130 but a list of only the shooting years corresponding to the content items of the above-selected genre and shooting location. Accordingly, it is possible to narrow down the shooting years displayed as options in the shooting year selection area 53 to only actually selectable shooting years and reduce the number of items (the number of displayed items) of the shooting year list. In the shooting year selection area 53, therefore, the user can easily find and select the content items imaged in a desired shooting year from the content items corresponding to the above-selected genre and shooting location.

In addition, in conjunction with the shooting location selection operation in the shooting location selection area 52, the CPU 110 changes the display mode (e.g., the size and the display position) of the scroll bar 73 in the shooting year selection area 53 in a similar manner as in the above-described example. Accordingly, if the user checks the changed size and display position of the scroll bar 73, the user can easily grasp the number of the shooting years displayed in a list in the shooting year selection area 53 and the position in the list of the currently selected shooting year. In the shooting year selection area 53, therefore, the user can more easily find and select the desired shooting year.

In the above, the GUI using the data selection screen 50 according to the modified example of the present embodiment has been described. According to the present embodiment, the genre selection area 51 (the first selection area), the shooting location selection area 52 (the second selection area), and the shooting year selection area 53 (the third selection area) display three different types of data items (i.e., the genre, the shooting location, and the shooting year) associated with the content items. In this case, in conjunction with the genre selection operation in the genre selection area 51, the modified example of the present embodiment changes the display content of the shooting location list in the shooting location selection area 52 and the display mode of the scroll bar 72. Further, in conjunction with the shooting location selection operation in the shooting location selection area 52, the modified example of the present embodiment changes the display content of the shooting year list in the shooting year selection area 53 and the display mode of the scroll bar 73.

According to the modified example of the present embodiment, with the operation of the scroll bars 71, 72, and on the above-described data selection screen 50, for example, the user can more smoothly select items from the genre list, the shooting location list, and the shooting year list. Further, upon selection of the genre, the shooting location selection area 52 displays a list of the shooting locations corresponding to the content items of the selected genre. Therefore, the user can easily select the shooting location without performing an extra operation. Similarly, upon selection of the shooting location, the shooting year selection area 53 displays a list of the shooting years corresponding to the content items imaged at the selected shooting location. Therefore, the user can easily select the shooting year without performing an extra operation. Further, the size and the display position of the scroll bars 72 and 73 are changeable in accordance with the number of the shooting location items and the number of the shooting year items. On the basis of the size and the display position of the scroll bars 72 and 73, therefore, the user can easily grasp the display range of the shooting location list and the shooting year list. Further, on the basis of the size of the scroll bars 72 and 73, the user can also easily grasp the number of items of the shooting location list and the number of items of the shooting year list.

In the above, preferred embodiments of the present invention have been described in detail with reference to the accompanying drawings. However, the present invention is not limited to the above-described examples. It is obvious that a person having ordinary knowledge in the technical field of the present invention could conceive of a variety of modified or altered examples within the scope of the technical concept described in the claims. Therefore, it is naturally understood that such examples also belong to the technical scope of the present invention.

For example, in the selection areas according to the above-described first embodiment, the shooting dates of the content items are displayed in a list as the data items. However, the present invention is not limited to the above-described example. The data items displayed in a list in a selection area may display identification information of the content items, such as the ID (Identifier), the title, and the file name, for example.

Further, in the above-described second embodiment, description has been made of the example of selecting the shooting month and the genre in FIG. 8 and the example of selecting the genre, the shooting location, and the shooting year in FIG. 9. However, the present invention is not limited to the above-described examples. For example, as described in the above-described cases (1) to (4), two arbitrary types of date items may be selected from the respective types of metadata, such as the shooting date 132, the genre 133, the GPS data 135, and the face data 136. Further, three or more arbitrary types of data items may be selected. Further, the selection order of the data items is not limited to the above-described examples of FIGS. 8 and 9, and thus may be arbitrary. Further, if time information is selected as an item, the time unit is not limited, and thus may be the time, date, month, season, year, or the like.

Further, the data selected in a GUI according to an embodiment of the present invention is not limited to the video content data as in the above-described embodiments, and thus may be arbitrary data which can be handled by a display control device such as audio content data, text data, and software program data, for example.

Further, in the above-described embodiments, description has been made of the example of applying a display control device according to an embodiment of the present invention to the imaging device 100 such as a video camera. However, the present invention is not limited to the above-described example. A display control device according to an embodiment of the present invention is applicable not only to the video camera, but also to arbitrary electronic devices such as imaging devices including a digital still camera and information appliances including a personal computer (PC), a mobile video player, a mobile phone, and a television receiver, for example.

Further, the display control device according to the above-described embodiments includes the display device (the liquid crystal panel 104) for displaying a screen for data selection. However, a display control device according to an embodiment of the present invention is not limited to the above-described example. For example, the display control device may not include a display device, and may control a display device included in another device connected to the display control device to display the screen for data selection.

Further, in the above-described embodiments, the touch panel 103 is used as the input unit for receiving the selection operation performed by the user. However, the present invention is not limited to the above-described example, and may use a key, a keyboard, and a mouse, or another operating element.

Further, in the system of the selection areas according to the above-described embodiments, the position of a central cursor is fixed, and a data item list is scrolled up and down to adjust a desired data item to the central cursor and select the data item. However, the present invention is not limited to the above-described example, and may use, for example, a system in which the selection made by a pointer, a cursor, or the like is moved in accordance with the user operation performed on the input unit, to thereby specify a desired data item and select the data item in a selection area.

It should be understood by those skilled in the art that various modifications, combinations, sub-combinations and alterations may occur depending on design requirements and other factors insofar as they are within the scope of the appended claims or the equivalents thereof.

What is claimed is:

1. A display control device, comprising:
   a display control unit configured to display, on a display screen, a first selection area displaying a list of a plurality of first data items, a first scroll bar displayed within a first scroll area having a size corresponding to a size of the first selection area, a second selection area displaying a list of a plurality of second data items, and a second scroll bar displayed within a second scroll area having a size corresponding to a size of the second selection area; and
   an input unit configured to receive a selection operation for selecting at least one item from the first data items displayed in the list in the first selection area by controlling the first selection area such that a first cursor is displayed atop the selected at least one item of the plurality of first data items,
   wherein, in conjunction with the selection operation of the first data item, the display control unit changes the second data items displayed in the list in the second selection area, and
   in accordance with the change in the number of the second data items displayed in the list in the second selection area, the display control unit reversely changes the size of the second scroll bar.

2. The display control device according to claim 1, wherein the display control unit extracts the first data items and the second data items from at least one data group held in a data table, and displays the list of the first data items and the list of the second data items in the first selection area and the second selection area, respectively.

3. The display control device according to claim 2, wherein, on the basis of the data table, the display control unit selects the second data items in accordance with the first data item selected by the selection operation, and displays a list of the selected second data items in the second selection area.

4. The display control device according to one of claims 2 to 3, wherein the first data items and the second data items are the same type of data items, and are extracted from the same data group held in the data table.

5. The display control device according to one of claims 2 to 3, wherein the first data items and the second data items are different types of data items, and are extracted from mutually different data groups associated with each other in the data table.

6. The display control device according to claim 2, wherein the data group held in the data table is metadata relating to content data, and wherein the display control device further comprises a reproduction unit configured to reproduce the content data corresponding to the first data item selected in the first selection area and the second data item selected in the second selection area.

7. The display control device according to claim 1, wherein the display control unit changes the size of the first scroll bar to cover a greater or lesser portion of the first scroll area in accordance with an opposite change in the number of the first data items displayed in the list in the first selection area.

8. The display control device according to claim 7, wherein the size of the first scroll bar increases within the first scroll area in response to the number of the first data items displayed in the list in the first selection area decreasing, and the size of the first scroll bar decreases within the first scroll area in response to the number of the first data items displayed in the list in the first selection area increasing.

9. The display control device according to claim 1, wherein the size of the second scroll bar increases within the second scroll area in response to the number of the second data items displayed in the list in the second selection area decreasing, and the size of the second scroll bar decreases within the second scroll area in response to the number of the second data items displayed in the list in the second selection area increasing.

10. A display control method, comprising:
    displaying, on a display screen, a first selection area displaying a list of a plurality of first data items, a first scroll bar displayed within a first scroll area having a size corresponding to a size of the first selection area, a second selection area displaying a list of a plurality of second data items, and a second scroll bar displayed within a second scroll area having a size corresponding to a size of the second selection area;
    receiving a user input for selecting one item from the plurality of first data items displayed in the list in the first selection area by controlling the first selection area such that a first cursor is displayed atop the selected at least one item of the plurality of first data items; and
    changing, in conjunction with the selection operation of the first data item, the second data items displayed in the list in the second selection area; and controlling, in accordance with the change in the number of the selected second data items displayed in the list in the second selection area, to reversely change the size of the second scroll bar.

11. The display control method according to claim 10, wherein the size of the second scroll bar increases within the second scroll area in response to the number of the second data items displayed in the list in the second selection area decreasing, and the size of the second scroll bar decreases within the second scroll area in response to the number of the second data items displayed in the list in the second selection area increasing.

12. The display control method according to claim 10, further comprising: changing the size of the first scroll bar to cover a greater or lesser portion of the first scroll area in accordance with an opposite change in the number of the first data items displayed in the list in the first selection area.

13. The display control device according to claim 12, wherein the size of the first scroll bar increases within the first scroll area in response to the number of the first data items displayed in the list in the first selection area decreasing, and the size of the first scroll bar decreases within the first scroll area in response to the number of the first data items displayed in the list in the first selection area increasing.

14. A processor having encoded therein a non-transitory computer-readable program for executing a display control method, comprising:
displaying, on a display screen, a first selection area displaying a list of a plurality of first data items, a first scroll bar displayed within a first scroll area having a size corresponding to a size of the first selection area, a second selection area displaying a list of a plurality of second data items, and a second scroll bar displayed within a second scroll area having a size corresponding to a size of the second selection area;
receiving a user input for selecting one item from the plurality of first data items displayed in the list in the first selection area by controlling the first selection area such that a first cursor is displayed atop the selected at least one item of the plurality of first data items; and
changing, in conjunction with the selection operation of the first data item, the second data items displayed in the list in the second selection area; and
controlling, in accordance with the change in the number of the selected second data items displayed in the list in the second selection area, to reversely change the size of the second scroll bar.

15. The processor according to claim 14, wherein the size of the second scroll bar increases within the second scroll area in response to the number of the second data items displayed in the list in the second selection area decreasing, and the size of the second scroll bar decreases within the second scroll area in response to the number of the second data items displayed in the list in the second selection area increasing.

16. The processor according to claim 14, wherein the display control method further comprises: changing the size of the first scroll bar to cover a greater or lesser portion of the first scroll area in accordance with an opposite change in the number of the first data items displayed in the list in the first selection area.

17. The processor according to claim 16, wherein the size of the first scroll bar increases within the first scroll area in response to the number of the first data items displayed in the list in the first selection area decreasing, and the size of the first scroll bar decreases within the first scroll area in response to the number of the first data items displayed in the list in the first selection area increasing.

18. A display control device, comprising:
a display control unit configured to display, on a display screen, a first selection area displaying a list of a plurality of start times, a first scroll bar displayed within a first scroll area having a size corresponding to a size of the first selection area, a second selection area displaying a list of a plurality of end times, and a second scroll bar displayed within a second scroll area having a size corresponding to a size of the second selection area; and
an input unit configured to receive a selection operation for selecting at least one start time from the start times displayed in the list in the first selection area by controlling the first selection area such that a first cursor is displayed atop the selected at least one start time of the plurality of start times,
wherein, in response to the selection operation of the start time, the display control unit changes the end times displayed in the list in the second selection area.

19. The display control device according to claim 18, wherein the display control unit extracts the start times and the end times from at least one data group held in a data table.

20. The display control device according to claim 19, wherein on the basis of the data table, the display control unit selects the end times in accordance with the first data item selected by the selection operation, and displays a list of the selected end times in the second selection area.

21. The display control device according to claim 19, wherein the data group held in the data table is metadata relating to content data, and wherein the display control device further comprises a reproduction unit configured to reproduce the content data corresponding to the start time selected in the first selection area and the end time selected in the second selection area.

22. A display control method, comprising:
displaying, on a display screen, a first selection area displaying a list of a plurality of start times, a first scroll bar displayed within a first scroll area having a size corresponding to a size of the first selection area, a second selection area displaying a list of a plurality of end times, and a second scroll bar displayed within a second scroll area having a size corresponding to a size of the second selection area; and
receiving a selection operation for selecting at least one start time from the start times displayed in the list in the first selection area by controlling the first selection area such that a first cursor is displayed atop the selected at least one start time of the plurality of start times,
wherein, in response to the selection operation of the start time, the display control unit changes the end times displayed in the list in the second selection area.

23. The display control method according to claim 22, wherein the displaying step extracts the start times and the end times from at least one data group held in a data table.

24. The display control method according to claim 23, wherein on the basis of the data table, the displaying step selects the end times in accordance with the first data item selected by the selection operation, and displays a list of the selected end times in the second selection area.

25. The display control method according to claim 23, wherein the data group held in the data table is metadata relating to content data, and wherein the displaying step further comprises reproducing the content data corresponding to the start time selected in the first selection area and the end time selected in the second selection area.

* * * * *